(12) United States Patent
Morinaga et al.

(10) Patent No.: US 10,857,776 B2
(45) Date of Patent: Dec. 8, 2020

(54) SHEET SEPARATION DEVICE, LAMINATOR, IMAGE FORMING APPARATUS, AND IMAGE FORMING SYSTEM

(71) Applicants: Takuya Morinaga, Tokyo (JP); Tomohiro Furuhashi, Kanagawa (JP); Michitaka Suzuki, Kanagawa (JP); Fumiharu Yoneyama, Kanagawa (JP); Tomomichi Hoshino, Kanagawa (JP); Wataru Takahashi, Tokyo (JP); Koki Sakano, Kanagawa (JP); Akira Kunieda, Tokyo (JP); Yohsuke Haraguchi, Kanagawa (JP); Makoto Hidaka, Tokyo (JP); Kazuyoshi Matsuo, Kanagawa (JP); Takahiro Watanabe, Kanagawa (JP)

(72) Inventors: Takuya Morinaga, Tokyo (JP); Tomohiro Furuhashi, Kanagawa (JP); Michitaka Suzuki, Kanagawa (JP); Fumiharu Yoneyama, Kanagawa (JP); Tomomichi Hoshino, Kanagawa (JP); Wataru Takahashi, Tokyo (JP); Koki Sakano, Kanagawa (JP); Akira Kunieda, Tokyo (JP); Yohsuke Haraguchi, Kanagawa (JP); Makoto Hidaka, Tokyo (JP); Kazuyoshi Matsuo, Kanagawa (JP); Takahiro Watanabe, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 16/745,653

(22) Filed: Jan. 17, 2020

(65) Prior Publication Data

US 2020/0247107 A1 Aug. 6, 2020

(30) Foreign Application Priority Data

Jan. 31, 2019 (JP) .................. 2019-015457

(51) Int. Cl.
*B32B 43/00* (2006.01)
*B32B 37/00* (2006.01)
(Continued)

(52) U.S. Cl.
CPC ........ *B32B 43/006* (2013.01); *B32B 37/0046* (2013.01); *B32B 37/142* (2013.01);
(Continued)

(58) Field of Classification Search
CPC ........... G03G 15/6582; G03G 15/6588; G03G 15/6591; G03G 15/6594; B32B 37/142;
(Continued)

(56) References Cited

U.S. PATENT DOCUMENTS

| | | | |
|---|---|---|---|
| 2005/0079968 A1* | 4/2005 | Trovinger | B65H 45/142 |
| | | | 493/356 |
| 2011/0073234 A1* | 3/2011 | Lee | B32B 41/00 |
| | | | 156/60 |

(Continued)

FOREIGN PATENT DOCUMENTS

| | | |
|---|---|---|
| JP | 9-150456 | 6/1997 |
| JP | 2001-328167 | 11/2001 |
| JP | 2006-160429 | 6/2006 |

*Primary Examiner* — Carla J Therrien
(74) *Attorney, Agent, or Firm* — Harness, Dickey & Pierce, P.L.C.

(57) ABSTRACT

A sheet separation device separates a two-ply sheet in which two sheets are bonded together at a portion. The sheet separation device includes a rotator, a nipping member opposite the rotator, to nip the two-ply sheet with the rotator, a conveyor to convey the two-ply sheet between the rotator and the nipping member, a winding member adjacent to the rotator, to wind the two-ply sheet around the rotator, and (Continued)

control circuitry. In winding the two-ply sheet, the control circuitry rotates the rotator at a first speed faster than a second speed at which the two-ply sheet moves to the rotator via the conveyor, and creates a difference in winding circumferential length between the two sheets, thereby separating the two sheets. The conveyor conveys the two-ply sheet with a bonded portion of the two-ply sheet being an upstream end or a downstream end in a conveyance direction of the two-ply sheet.

20 Claims, 23 Drawing Sheets

(51) Int. Cl.
*G03G 15/00* (2006.01)
*B32B 37/14* (2006.01)
*B32B 37/18* (2006.01)

(52) U.S. Cl.
CPC ......... *B32B 37/18* (2013.01); *G03G 15/6588* (2013.01); *B32B 2037/0061* (2013.01)

(58) Field of Classification Search
CPC ..... B32B 37/18; B32B 37/182; B32B 37/185; B32B 37/187; B32B 41/00; B32B 43/006
See application file for complete search history.

(56) References Cited

U.S. PATENT DOCUMENTS

2017/0341885 A1 11/2017 Suzuki et al.
2018/0259895 A1 9/2018 Shibasaki et al.
2019/0284012 A1 9/2019 Yoneyama et al.
2020/0247636 A1* 8/2020 Furuhashi ............ B65H 29/125

* cited by examiner

DIFFERENCE DUE TO CIRCUMFERENCE

SHEET SEPARATION DEVICE, LAMINATOR, IMAGE FORMING APPARATUS, AND IMAGE FORMING SYSTEM

CROSS-REFERENCE TO RELATED APPLICATION

This patent application is based on and claims priority pursuant to 35 U.S.C. § 119(a) to Japanese Patent Application No. 2019-015457 filed on Jan. 31, 2019, in the Japan Patent Office, the entire disclosure of which is hereby incorporated by reference herein.

BACKGROUND

Technical Field

This disclosure relates to a sheet separation device, a laminator, an image forming apparatus, and an image forming system.

Related Art

There is known a lamination technique of inserting an insertion sheet (paper, photo, etc.) between a two-ply laminate sheet or laminate film (e.g., a lamination pouch or lamination folder) in which two sheets are bound (sealed) on one side as if one sheet is folded. The two-ply laminate sheet is bonded, with the insertion sheet sandwiched therebetween, with heat and pressure.

In a conventional laminating process, there is an adhesive layer on the inside of the two-ply laminate sheet that resist separation, thereby requiring that a user separates the two sides of the laminate sheet by hand. The user then manually inserts the insertion sheet in the two-ply sheet and bonds the laminate sheet using a lamination machine (hereinafter simply "laminator").

SUMMARY

An embodiment of this disclosure provides a sheet separation device to separate a two-ply sheet in which two sheets are bonded together at a portion of the two-ply sheet. The sheet separation device includes a rotator, a nipping member disposed opposite the rotator and configured to nip the two-ply sheet with the rotator, a conveyor configured to convey the two-ply sheet between the rotator and the nipping member, a winding member disposed adjacent to the rotator and configured to wind the two-ply sheet around the rotator, and control circuitry configured to control operation of the sheet separation device. In winding the two-ply sheet around the rotator, the control circuitry rotates the rotator at a first speed faster than a second speed at which the two-ply sheet moves to the rotator via the conveyor, and creates a difference in winding circumferential length between the two sheets, thereby separating the two sheets. The conveyor conveys the two-ply sheet with a bonded portion of the two-ply sheet being an upstream end or a downstream end of the two-ply sheet in a conveyance direction of the two-ply sheet.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1A:
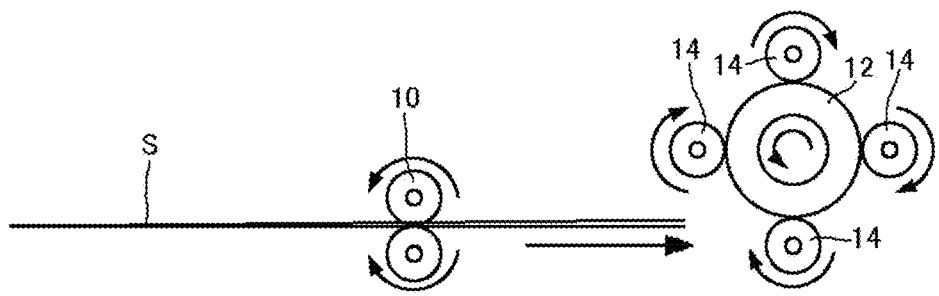
FIGS. 1A to 1D are schematic views illustrating a sheet separation device considered by the inventors of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Before describing embodiments of the present disclosure, backgrounds are described below for facilitating understanding of the embodiments.

The inventors have considered winding two sheets of a two-ply sheet around a rotator such as a roller and creating a difference in winding circumferential length between the two overlaying sheets due to a geometrical relationship, to separate the sheets.

Figure 1B:
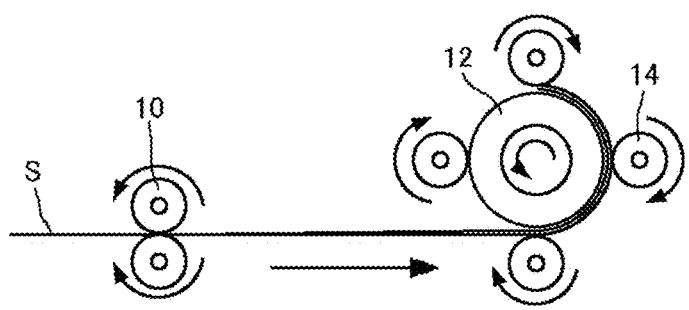
Figure 1C:
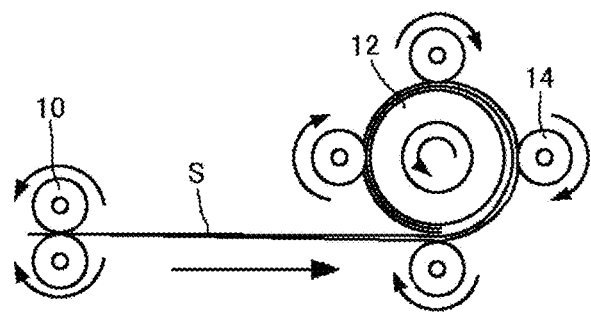
Figure 1D:
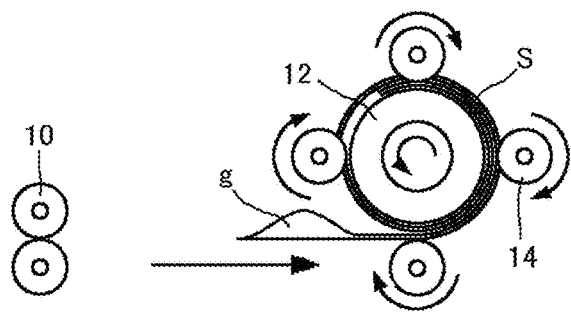

FIGS. 1A to 1D are schematic views illustrating a sheet separation device considered by the inventors. The sheet separation device conveys a two-ply sheet S to a winding roller 12 with a conveyance roller pair 10 as illustrated in FIG. 1A; winds the two-ply sheet S around the winding roller 12 with a plurality of grip rollers 14 as illustrated in FIG. 1B; winds the two-ply sheet S over the full circumference of the winding roller 12 or greater, to secure the tip of the two-ply sheet S on the winding roller 12 as illustrated in FIG. 1C; and further winds the two-ply sheet S around the winding roller 12 as illustrated in FIG. 1D, to create a difference in winding circumferential length between the two sheets, thereby separating the sheets (a space g is generated). Thus, the two sheets of the two-ply sheet are separated.

Figure 2A:
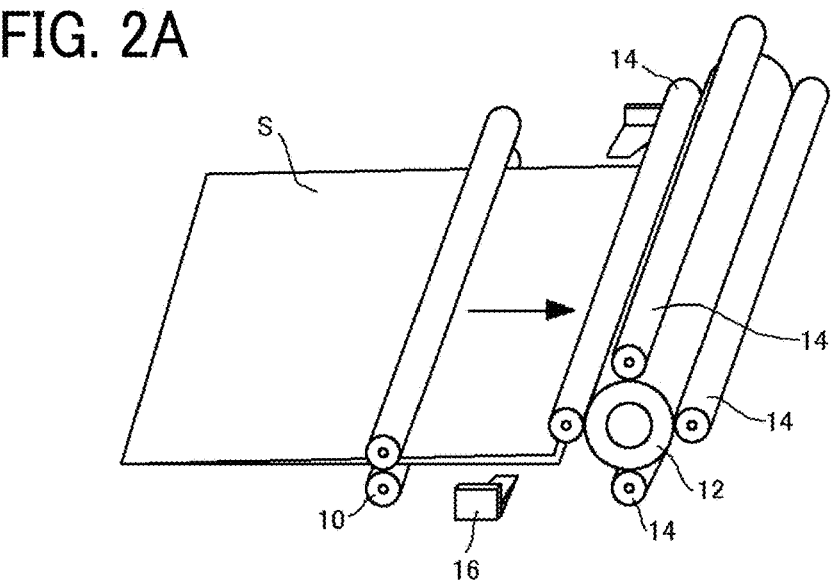
FIGS. 2A to 2C are schematic perspective views of a sheet separation device including a separation claw considered by the inventors.
Figure 2B:
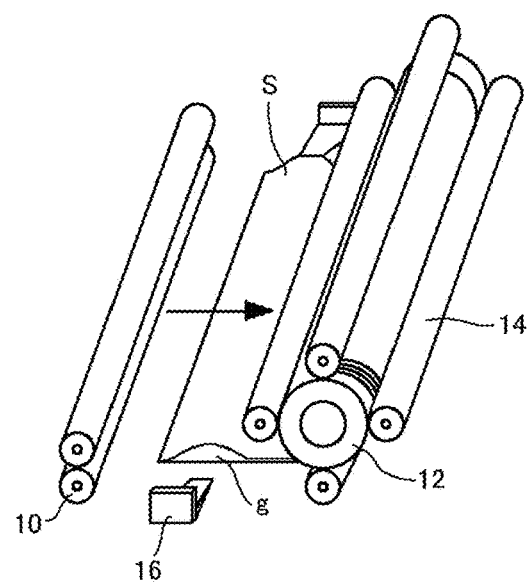
Figure 2C:
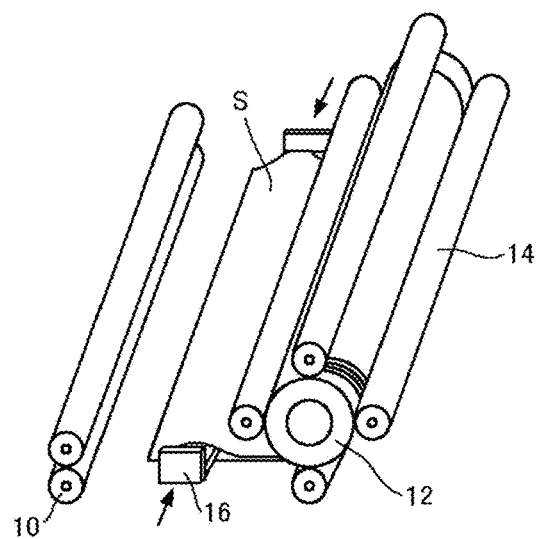

FIGS. 2A to 2C are schematic perspective views of a sheet separation device including a separation claw considered by the inventors. As illustrated in FIG. 2B, as separation claws 16 move into the space g created in the separated two-ply sheets S, the two sheets of the two-ply sheet S can be separated from each other.

The sheet separation device illustrated in FIGS. 1A to 2C can separate the two sheets of the two-ply sheet S with a simple configuration that winds the two-ply sheet S around the winding roller 12. Therefore, the device can be simple and compact, and the cost is relatively low.

In the work toward commercialization, the inventors have discovered the following inconvenience.

Figure 3A:
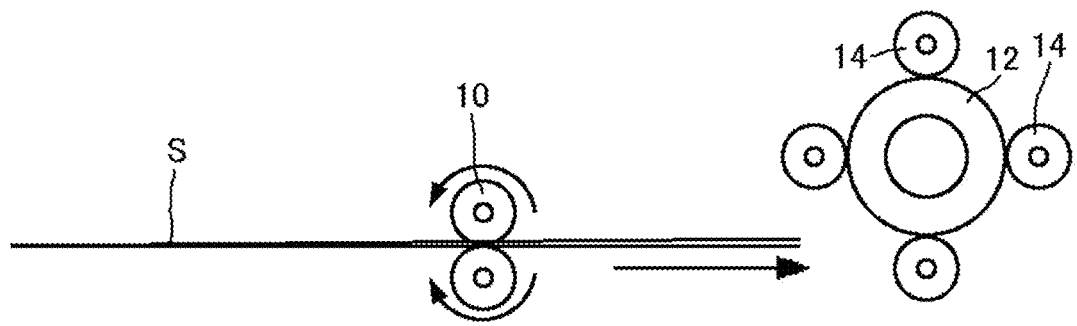
FIGS. 3A to 3C are schematic views illustrating a problem of the sheet separation device considered by the inventors.
Figure 3B:
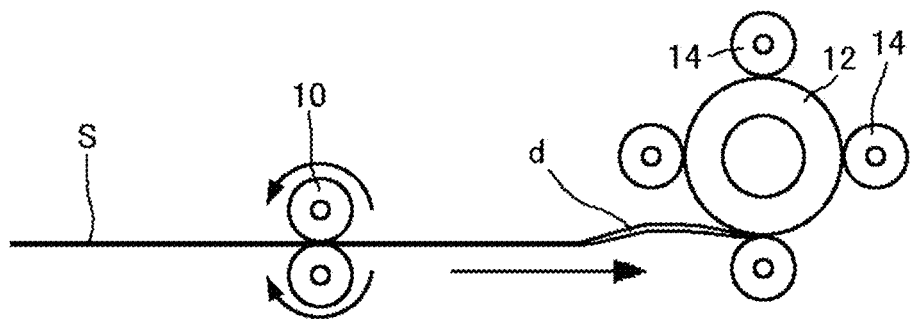
Figure 3C:
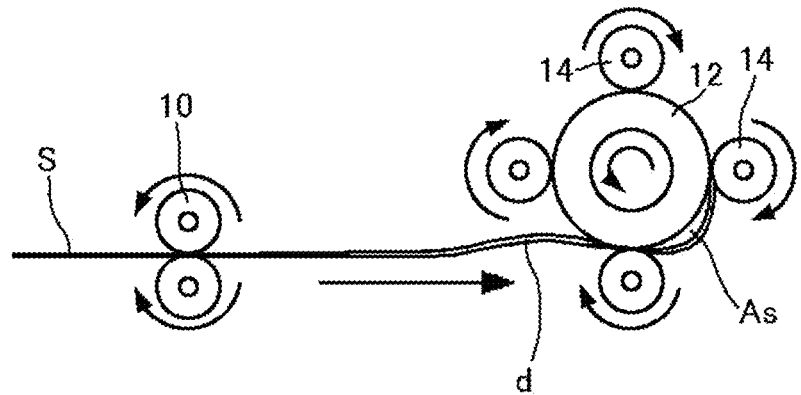
Figure 4:
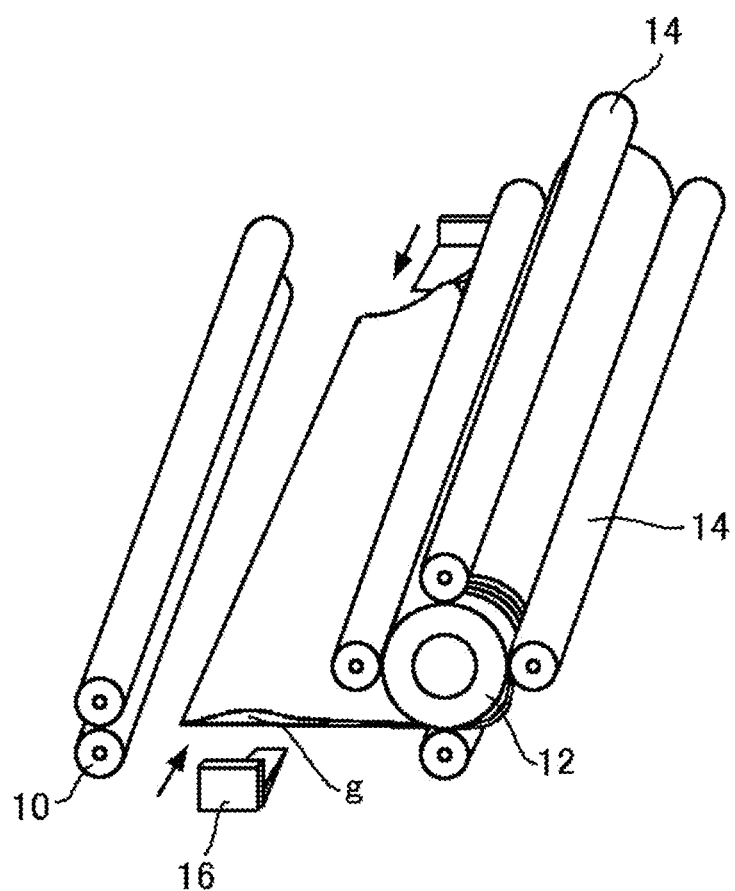
FIG. 4 is a schematic perspective views of the sheet separation device including the separation claw; considered by the inventors.

FIGS. 3A to 3C are schematic views illustrating the inconvenience in the sheet separation device considered by the inventors. FIG. 4 is a perspective view of the sheet separation device including the separation claws illustrated considered by the inventors. Ideally, the sheet separation device tightly and uniformly winds the two-ply sheet S around the winding roller 12. However, for example, as illustrated in FIG. 3B, when an end of the two-ply sheet S is caught in the nip of the winding roller 12 for skew correction, there is a risk that the two-ply sheet S bends (to have a bending d) between the conveyance roller pair 10 and the winding roller 12.

If the two-ply sheet S is wound with the bending d, a force for pushing the two-ply sheet S to the winding roller 12 is generated. Therefore, as illustrated in FIG. 3C, the two-ply sheet S does not tightly adhere to the winding roller 12 and an air layer As may be generated. The air layer As is not necessarily uniform in the width direction of the winding roller 12. If the winding is continued with the air layer As remaining, the two-ply sheet S is wound while being distorted.

In this case, as illustrated in FIG. 4, the space g generated in the two-ply sheet S is also distorted, inhibiting insertion of the separation claws 16.

Referring now to the drawings, wherein like reference numerals designate identical or corresponding parts throughout the several views thereof, sheet separation devices according to embodiments of this disclosure are described. As used herein, the singular forms "a", "an", and "the" are intended to include the plural forms as well, unless the context clearly indicates otherwise.

The embodiments described below concern sheet separation devices having a relatively simple mechanism of winding a two-ply sheet around a winding roller (a rotator) and conveying the two-ply sheet without bending. Accordingly, the two-ply sheet can be tightly wound around the winding roller reliably separated.

The sheet separation devices according to embodiments of this disclosure is to separate two sheets of a two-ply sheet (hereinafter referred to as a lamination sheet S) and to insert and sandwich an insertion sheet P between the separated sheets of the two-ply sheet.

The lamination sheet S is a two-ply sheet constructed of two overlapping sheets and bonded (or joined) at one portion (or on one side).

For example, there is a two-ply sheet in which a first side is a transparent sheet such as a transparent polyester sheet and the opposite side is a transparent or opaque sheet and bonded to the other sheet on one side thereof.

The insertion sheet P is an example of a sheet medium that is inserted into the two-ply sheet. The insertion sheets P is a recording medium and can be plain paper, thick paper, postcards, envelopes, thin paper, coated paper (art paper, etc.), tracing paper, overhead projector (OHP) transparencies, and the like.

In the present specification, "separating the lamination sheet S" and "opening the two-ply lamination sheet S" signify peeling one of the two-sheets of the two-ply lamination sheet S from the other.

Figure 5:
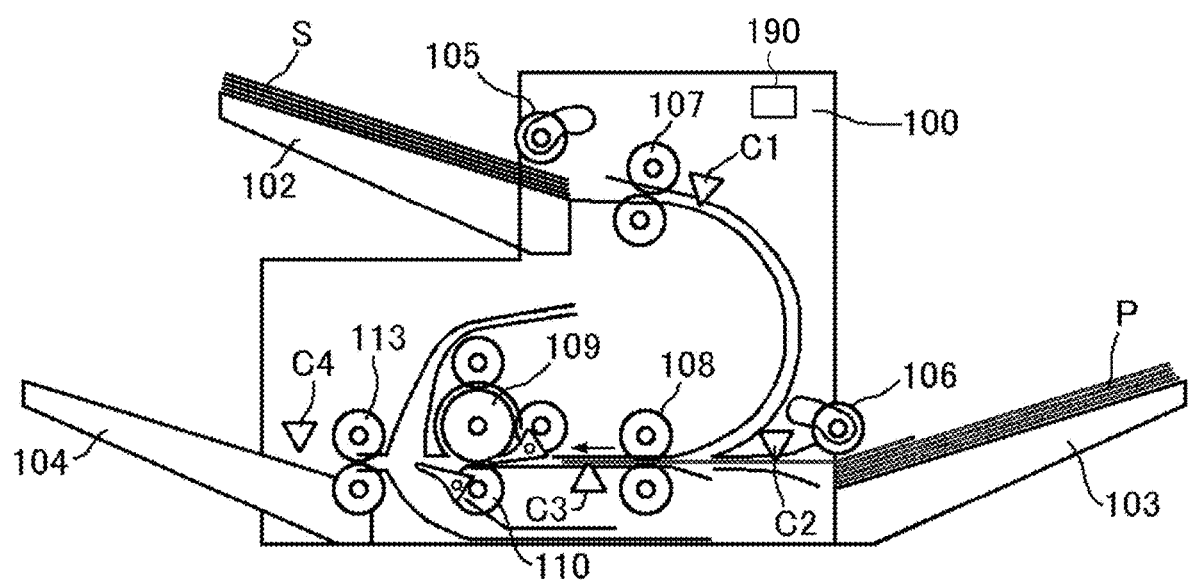
FIG. 5 is a schematic view illustrating a general arrangement of a sheet separation device according to one embodiment of the present disclosure.

FIG. 5 is a schematic view illustrating a general arrangement of a sheet separation device according to one embodiment of the present disclosure. As illustrated in FIG. 5, a sheet separation device 100 includes a sheet tray 102 that is a first stacking tray on which the lamination sheets S are stacked, a pickup roller 105 that feeds the lamination sheet S from the sheet tray 102, and a conveyance roller pair 107. The sheet separation device 100 further includes a sheet feeding tray 103 that is a second stacking tray on which the insertion sheets P are stacked, and a pickup roller 106 that feeds the insertion sheets P from the sheet feeding tray 103.

A sheet sensor C1 to detect the position of the lamination sheet S being conveyed is disposed downstream from the conveyance roller pair 107 in a conveyance direction of the lamination sheet S. A sheet sensor C2 to detect the position of the insertion sheet P being conveyed is disposed downstream from the pickup roller 106 in a conveyance direction of the insertion sheet P.

The sheet separation device 100 further includes an entrance roller pair 108, a winding roller 109 as a rotator, a driven roller 110 as a first nipping member described later, an exit roller pair 113 (a pair of rotators), an output tray 104, and the like, downstream from the conveyance roller pair 107 and the pickup roller 106 in the conveyance direction of the lamination sheet S and the insertion sheet P. The winding roller 109 and the driven roller 110 are paired as a roller pair. A sheet sensor C3 to detect the position of the lamination sheet S and the insertion sheet P being conveyed is disposed downstream from the entrance roller pair 108 in the conveyance direction. A sheet sensor C4 to detect the position of the lamination sheet S being conveyed is disposed downstream from the exit roller pair 113 in the conveyance direction.

The pickup roller 105, the conveyance roller pair 107, the entrance roller pair 108, and the roller pair constructed of the winding roller 109 and the driven roller 110 are examples of a first feeder. The pickup roller 106, the entrance roller pair 108, and the roller pair constructed of the winding roller 109 and the driven roller 110 are examples of a second feeder. The sheet separation device 100 further includes a controller 190 including a central processing unit (CPU) and the like. The controller 190 controls the operation of the sheet separation device 100 and performs a determination process and the like described later.

As illustrated in FIG. 5, in the sheet separation device 100 according to the present embodiment, the lamination sheets S and the insertion sheets P are stacked on separate trays and fed between the roller pair constructed of the winding roller 109 and the driven roller 110 and further to the exit roller pair 113. As will be described later, in a state where the lamination sheet S is between the exit roller pair 113 and the roller pair constructed of the winding roller 109 and the driven roller 110, the insertion sheet P is inserted into the two-ply lamination sheet S being opened. Then, the exit roller pair 113 ejects and stacks the lamination sheet S, in which the insertion sheet P is inserted, onto the output tray 104. The configuration and operation thereof are described in detail below.

Figure 6:
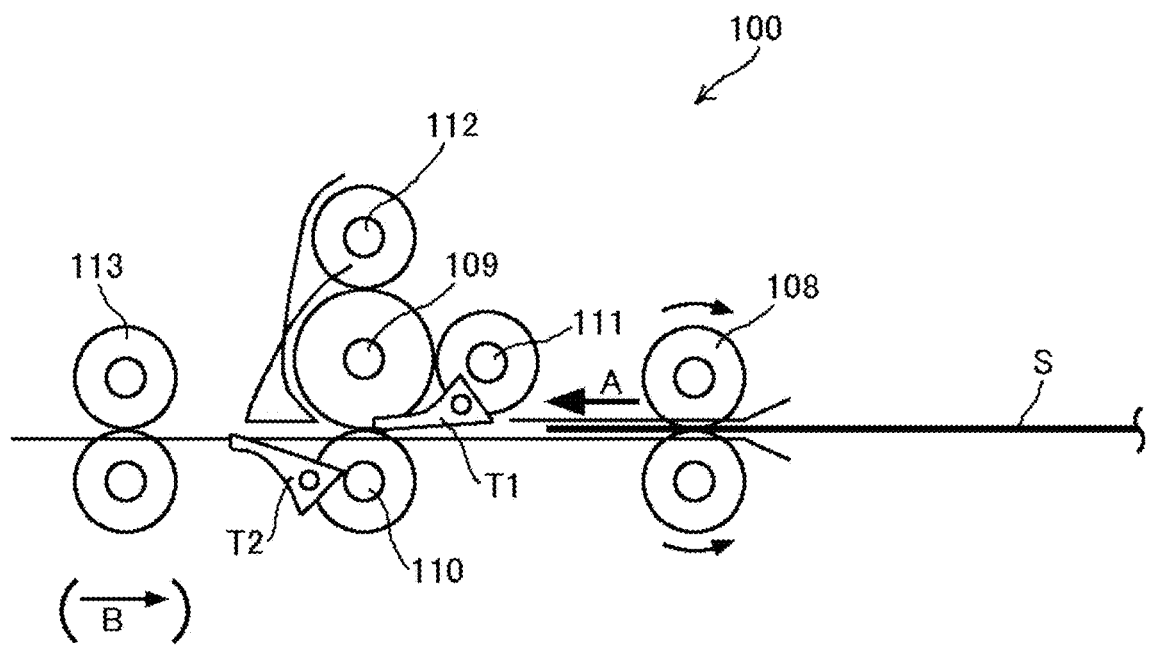
FIG. 6 is a view of a main part of the sheet separation device according to one embodiment.

FIG. 6 is a view of a main part of the sheet separation device according to the present embodiment. As illustrated in FIG. 6, the sheet separation device 100 includes the exit roller pair 113 serving as the first conveyor. The exit roller pair 113 conveys the lamination sheet S between the roller pair of the winding roller 109 and the driven roller 110.

Each of the entrance roller pair 108 and the exit roller pair 113 is, for example, two rollers paired with each other. Driven by a driver (a motor or the like), the entrance roller pair 108 rotates in one direction, whereas the exit roller pair 113 rotates in forward and reverse directions, thereby nipping and conveying the lamination sheet S and the insertion sheet P.

The entrance roller pair 108 conveys the lamination sheet S and the insertion sheet P toward the exit roller pair 113. The conveyance direction indicated by arrow A is referred to as a forward conveyance direction (or direction A).

By contrast, the exit roller pair 113 can switch the direction of rotation between the forward direction and the reverse direction. The exit roller pair 113 can convey the nipped lamination sheet S in the forward conveyance direction toward the output tray 104 (see FIG. 5) and the reverse direction in which the lamination sheet S is drawn back toward the winding roller 109. The conveyance direction toward the winding roller 109 (the direction indicated by arrow B and reverse to the forward conveyance direction) is referred to as the backward conveyance direction (or direction B).

Between the entrance roller pair 108 and the exit roller pair 113, the sheet separation device 100 further includes the winding roller 109 that is the rotator and the driven roller 110 that is the first nipping member. The driven roller 110 rotates with the winding roller 109.

Driven by a driver (motor or the like), the winding roller 109 rotates in the forward and reverse directions, and the direction of rotation can be switched between the forward direction and the reverse direction (clockwise and counterclockwise). The driven roller 110 is in contact with the winding roller 109 forming a nip therewith. The winding roller 109 and the driven roller 110 nip and convey the lamination sheet S and the insertion sheet P.

The sheet separation device 100 further includes, as second nipping members (rollers), grip rollers 111 and 112 arranged at an interval from each other and bifurcating claws T1 and T2 around the circumference (outer circumferential surface) of the winding roller 109, which is orthogonal to the rotation axis of the winding roller 109. The bifurcating claws T1 and T2 switch the conveyance direction of the lamination sheet S.

The plurality of grip rollers 111 and 112 is in contact with the winding roller 109 and rotates with the winding roller 109. The grip rollers 111 and 112, together with the winding roller 109, nip (grip) the lamination sheet S and wind the lamination sheet S around the winding roller 109.

The bifurcating claw T1 is disposed between the entrance roller pair 108 and the winding roller 109. the bifurcating claw T2 is disposed between the winding roller 109 and the exit roller pair 113. The positions (orientations) of the bifurcating claws T1 and T2 can be changed by a driver (a motor or the like), and the conveyance direction of the lamination sheet S can be changed.

The grip rollers 111 and 112 and the bifurcating claws T1 and T2 are examples of winding members to wind the lamination sheet S around the winding roller 109.

With reference to FIGS. 5 to 18, a description is given of a series of operations of the sheet separation device 100, that is, operations from separation of the lamination sheet S to insertion of the insertion sheet P. In FIGS. 7 to 18, elements identical to those illustrated in FIG. 5 or 6 are given identical reference numerals, and the descriptions thereof are omitted.

As illustrated in FIG. 5, in the sheet separation device 100 according to the present embodiment, the lamination sheets S, in each of which two sheets are bonded partly, are stacked on the sheet tray 102. The lamination sheets S are stacked with the bonded side thereof on the downstream side in the direction of feeding (conveyance direction) of the pickup roller 105. The pickup roller 105 picks up the lamination sheet S from the sheet tray 102, and the conveyance roller pair 107 conveys the lamination sheet S toward the entrance roller pair 108.

Next, as illustrated in FIG. 6, the lamination sheet S is conveyed by the entrance roller pair 108 toward the nip between the winding roller 109 and the driven roller 110. At this time, the bifurcating claws T1 and T2 are positioned above and below the conveyance passage of the lamination sheet S. The bifurcating claw T1 guides the lamination sheet S from the entrance roller pair 108 between the winding roller 109 and the driven roller 110. The bifurcating claw T2 guides the lamination sheet S from between the winding roller 109 and the driven roller 110 to the exit roller pair 113.

In the present embodiment, ends of the two sheets of the lamination sheet S are bonded together on one of the four sides, and the sheet separation device 100 conveys the lamination sheet S with the bonded side on the downstream side (leading side) in the forward conveyance direction (direction A). However, the manner of conveyance is not limited thereto but can be as follows. The lamination sheets S are stacked on the sheet tray 102 such that the bonded side thereof is on the upstream side (rear side) in the direction of feeding (conveyance direction) of the pickup roller 105. The lamination sheet S fed from the sheet tray 102 is conveyed to the exit roller pair 113 in the direction opposite to the direction of conveyance of the exit roller pair 113 toward the winding roller 109.

Figure 7:
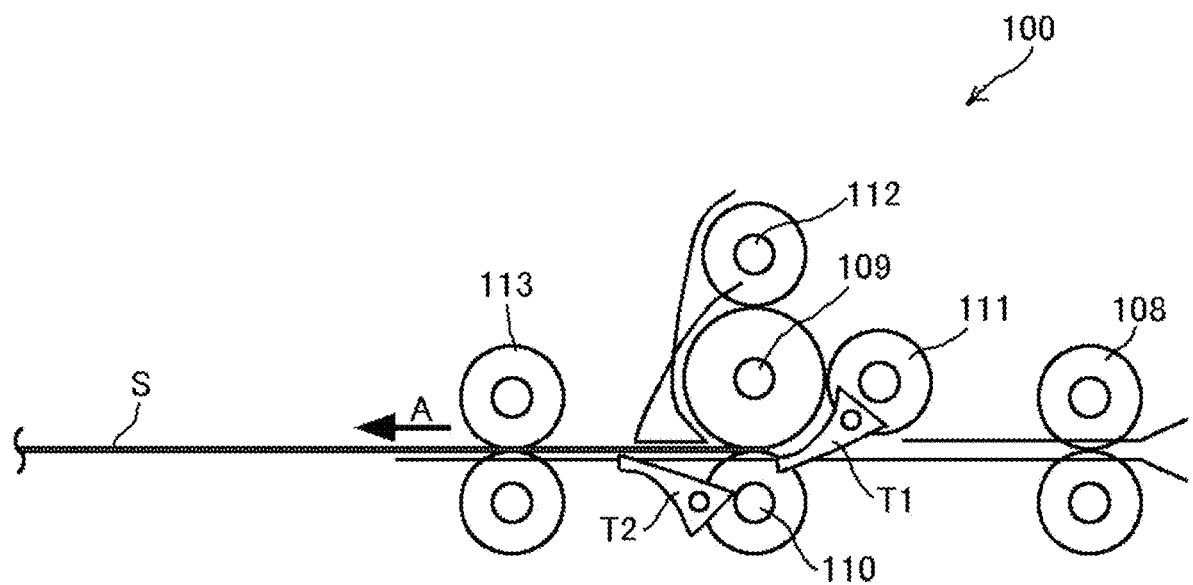
FIG. 7 is a view of a main part of the sheet separation device according to one embodiment.

Subsequently, as illustrated in FIG. 7, the sheet separation device 100 suspends conveyance of the lamination sheet S after the rear end of the lamination sheet S in the forward conveyance direction passes the bifurcating claw T1. For example, when the rear end is nipped between the winding roller 109 and the driven roller 110, the sheet separation device 100 suspends conveyance. At the same time, the bifurcating claw T1 moves (rotates) counterclockwise in the drawing around the rotation axis as a fulcrum, to form a passage (i.e., a winding passage) to guide the rear end of the lamination sheet S around the winding roller 109. These actions can be triggered by the detection of position of the lamination sheet S by the sheet sensor C3 (see FIG. 5).

Figure 8:
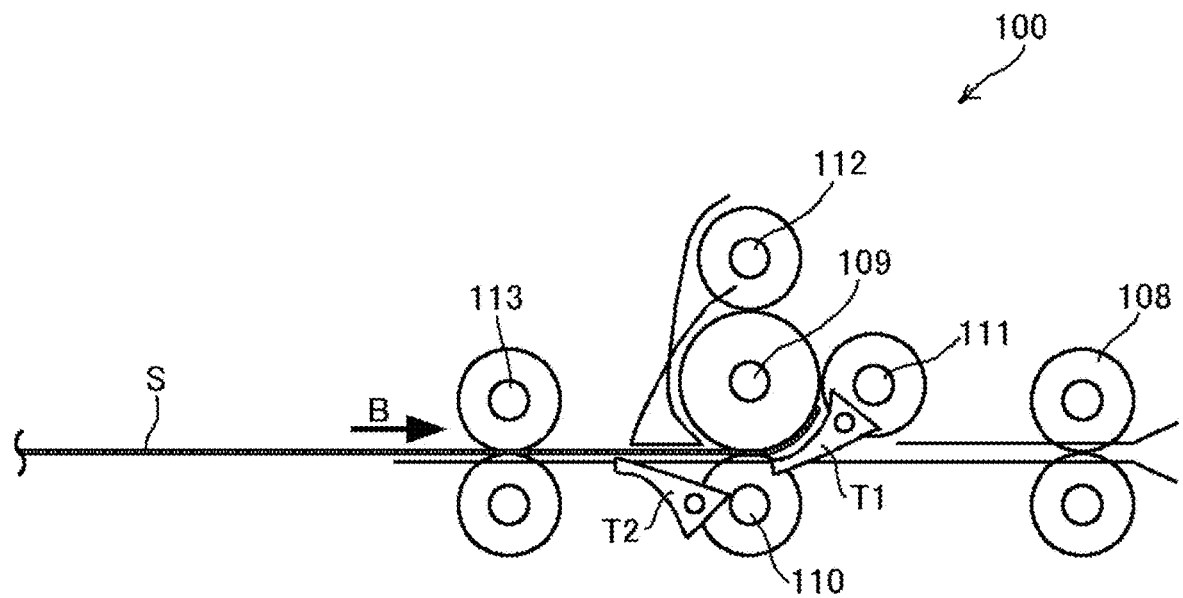
FIG. 8 is a view of a main part of the sheet separation device according to one embodiment.

Next, as illustrated in FIG. 8, the exit roller pair 113 and the winding roller 109 reverse the rotation direction and convey the lamination sheet S in the backward conveyance direction (direction B). Then, the lamination sheet S is guided around the winding roller 109 by the bifurcating claw T1. That is, the sheet separation device 100 winds the lamination sheet S around the winding roller 109 from the side where the two overlapping sheets of the lamination sheet S are not bonded. Note that the rotation direction of the winding roller 109 at this time is referred to as a first rotation direction.

Figure 9:
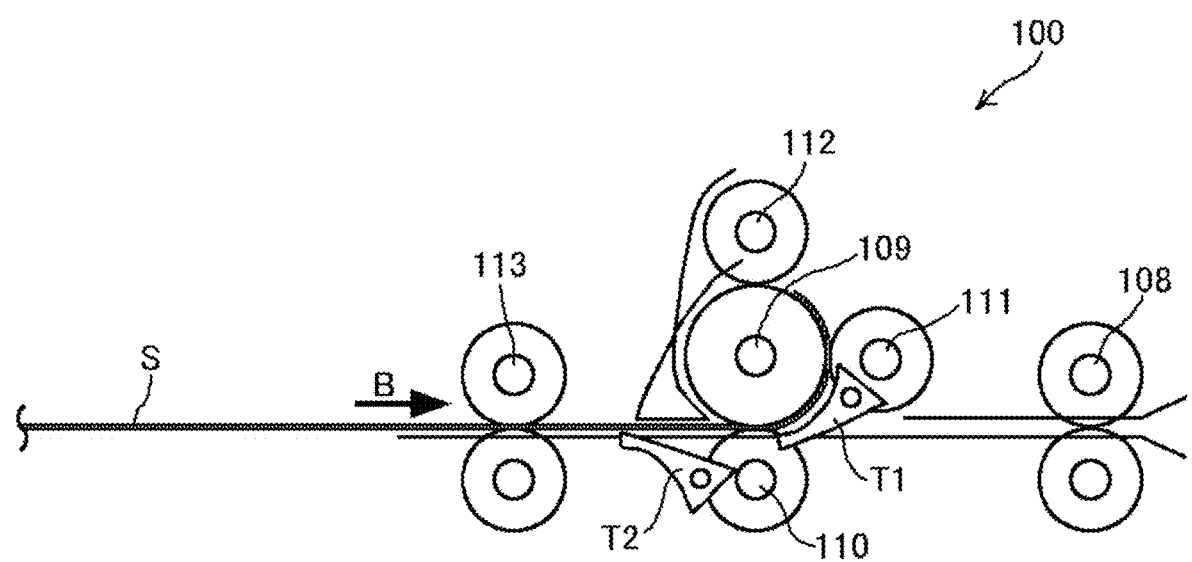
FIG. 9 is a view of a main part of the sheet separation device according to one embodiment.
Figure 10:
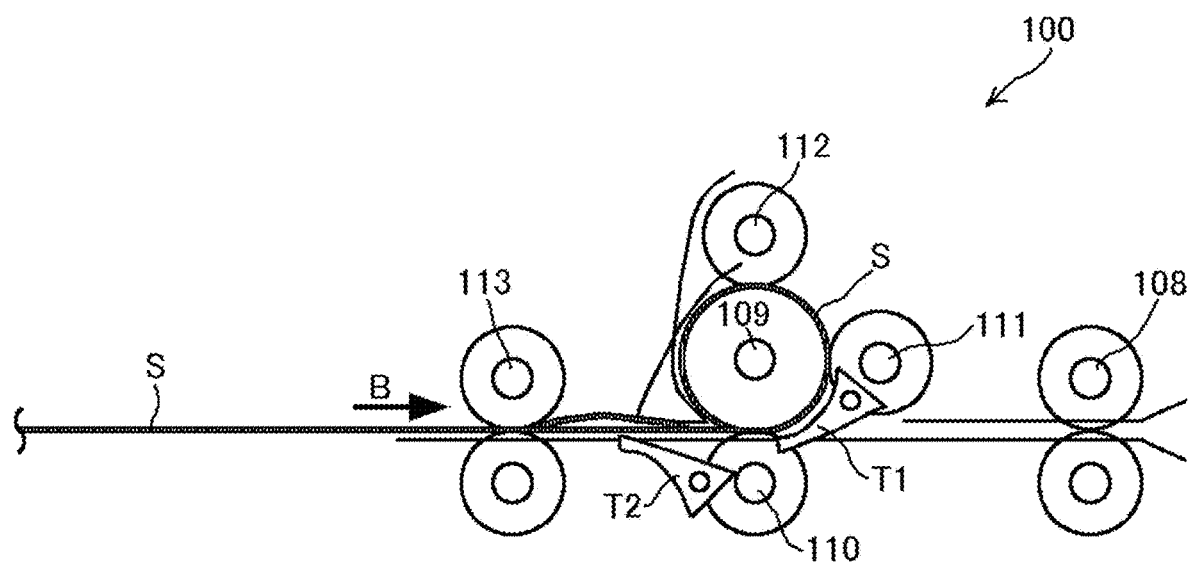
FIG. 10 is another view of the main part of the sheet separation device according to one embodiment.
Figure 11:
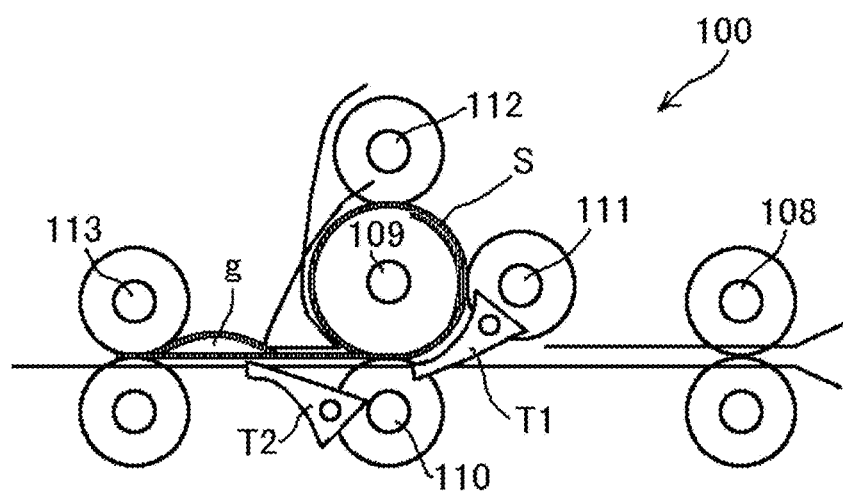
FIG. 11 is another view of the main part of the sheet separation device according to one embodiment.

FIGS. 9 to 11 illustrate a process of winding the lamination sheet S around the winding roller 109. The grip rollers 111 and 112 nip the fed lamination sheet S with the winding roller 109 and wind the lamination sheet S around the circumference of the winding roller 109 (see FIG. 9).

When the lamination sheet S is wound around the winding roller 109 over the entire circumference or greater, the end (the unbonded side of the lamination sheet S) of the lamination sheet S is secured to the winding roller 109. As the lamination sheet S is further wound around the winding roller 109, a difference in the circumferential length (a difference in winding amount) is created between the inner peripheral side sheet of the two-ply lamination sheet S and the outer peripheral side sheet thereof. Then, between the exit roller pair 113 and the winding roller 109, the lamination sheet S begins to separate (i.e., a gap starts appearing in the lamination sheet S), as illustrated in FIG. 10.

Then, as illustrated in FIG. 11, the slack in the inner sheet gathers between the exit roller pair 113 and the winding roller 109, and a gap (space) g is created between the inner sheet and the outer sheet.

As described above, the sheet separation device 100 according to the present embodiment winds the lamination sheet S around the winding roller 109, thereby creating a difference in winding circumferential length between the inner sheet and the outer sheet from a geometrical relationship. Thus, the lamination sheet S can be reliably separated.

Subsequently, a description is given of, in the sheet separation device 100 according to the present embodiment, additional configuration for separating the lamination sheet S entirely between the bonded side (one end) and the other side (the other end) that is an opening end opposed to the bonded side and inserting the insertion sheet P therein and the operation thereof.

Figure 12:
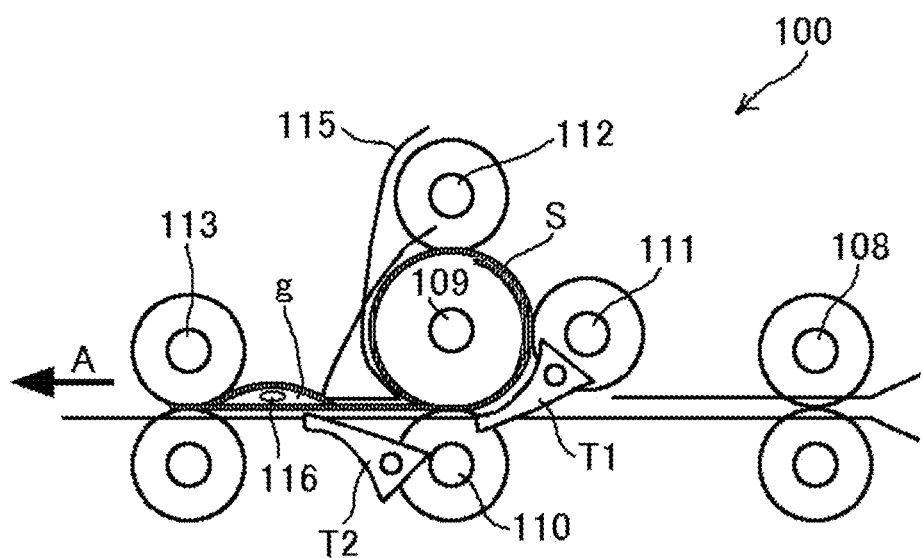
FIG. 12 is another view of the main part of the sheet separation device according to one embodiment.

As illustrated in FIG. 12, the sheet separation device 100 according to the present embodiment further includes a sheet guide 115 and separation claws 116. The sheet guide 115 is a passage member that defines a conveyance passage and guides one of the separated sheets of the lamination sheet S. The separation claws 116 are disposed on both sides in the width direction of the lamination sheet S and movable in the width direction. The sheet separation device 100 can insert the separation claws 116 into the gap g generated in the lamination sheet S from both sides in the width direction.

Figure 13:
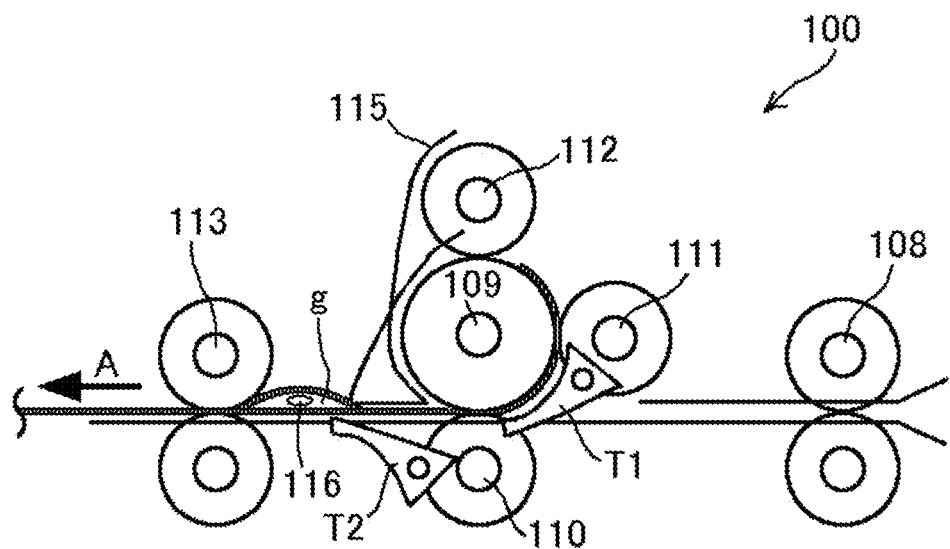
FIG. 13 is another view of the main part of the sheet separation device according to one embodiment.
Figure 14:
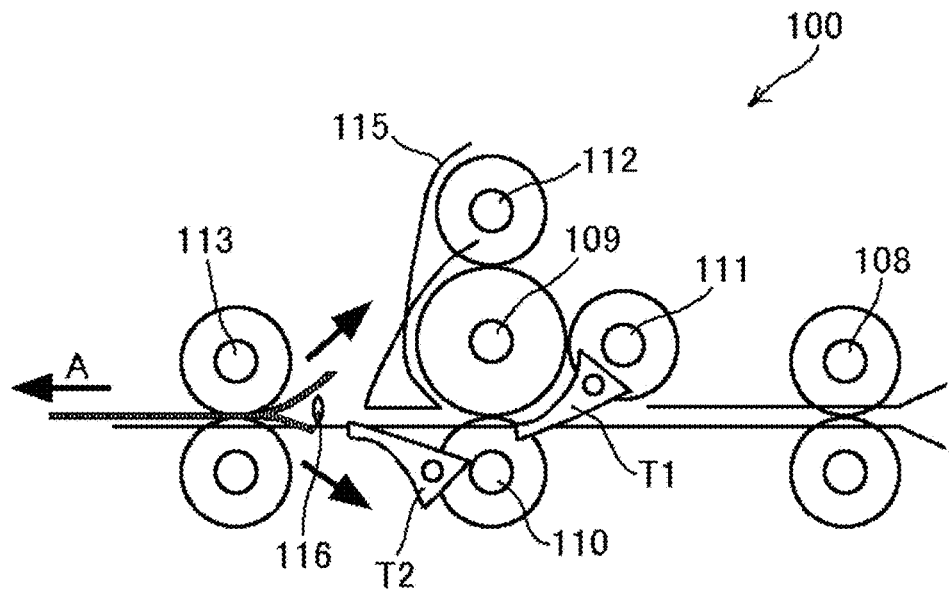
FIG. 14 is another view of the main part of the sheet separation device according to one embodiment.

As illustrated in FIG. 13, the sheet separation device 100 rotates the exit roller pair 113 to convey the lamination sheet S in the forward conveyance direction (direction A) with the separation claws 116 inserted in the gap g. Then, as illustrated in FIG. 14, when the separation claws 116 reach the rear end of the lamination sheet S in the conveyance direction, the rear end (opening) of the lamination sheet S can be separated.

The separation claws 116 are described further.

Figure 19:
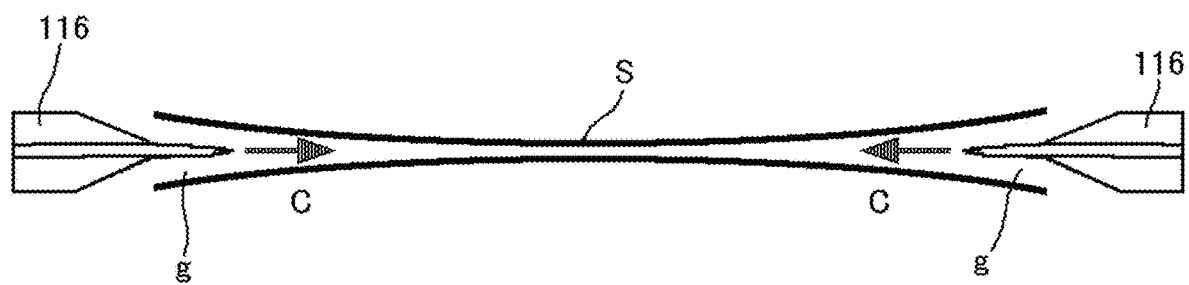
FIG. 19 is a schematic view of a separation claw of the sheet separation device.
Figure 20:
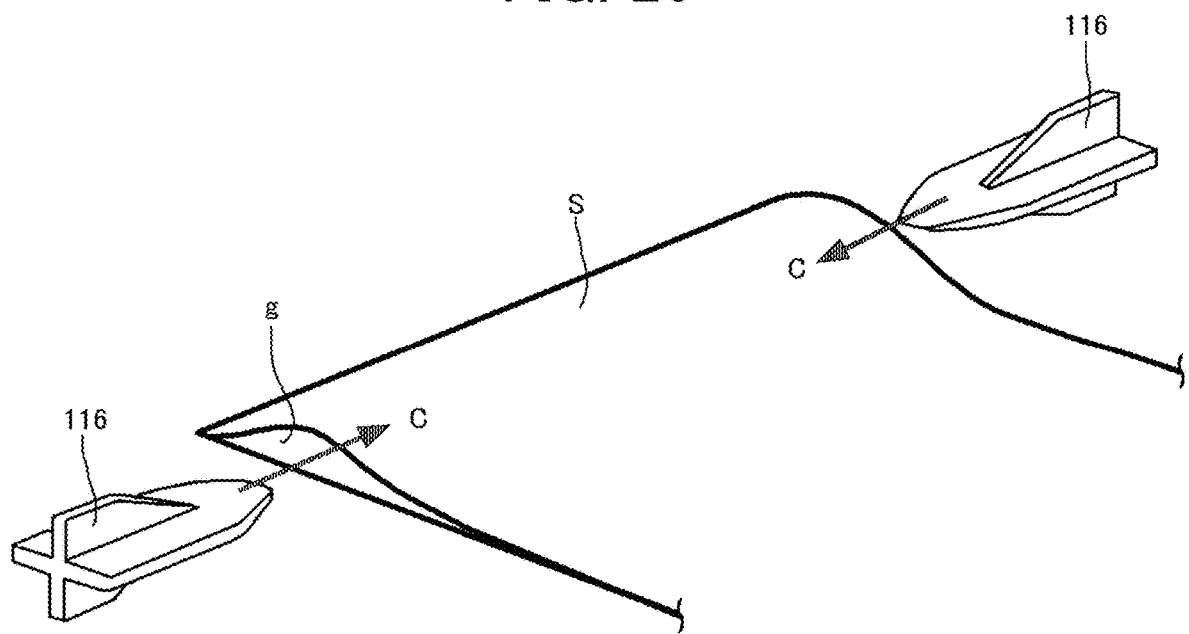
FIG. 20 is a perspective view illustrating how the separation claw separates two sheets of a lamination sheet from each other.
Figure 21:
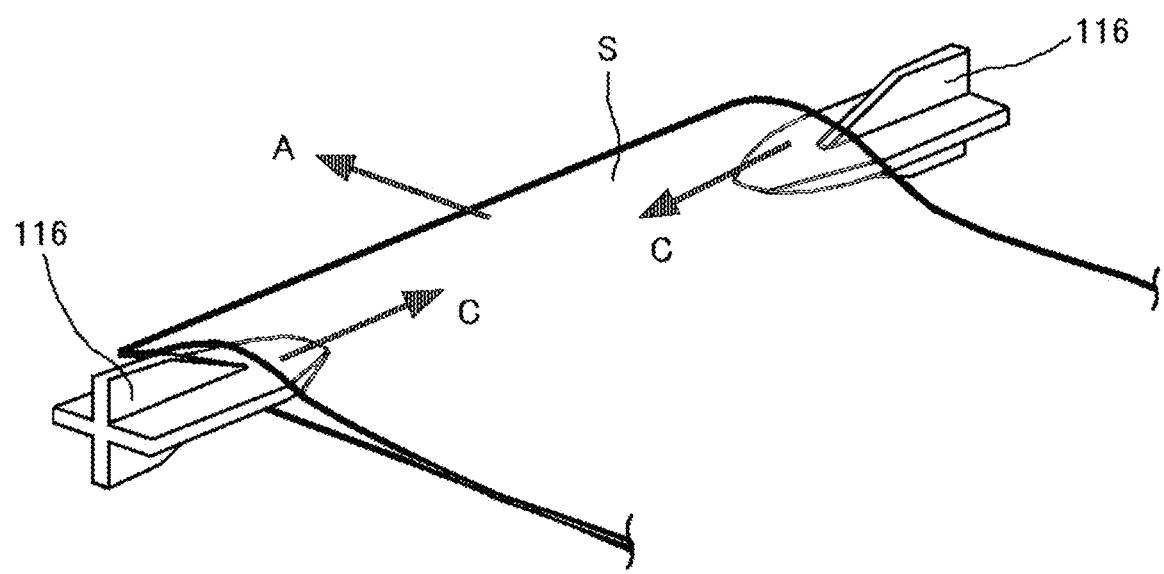
FIG. 21 is another perspective view illustrating how the separation claw separates the two sheets of the lamination sheet from each other.
Figure 22:
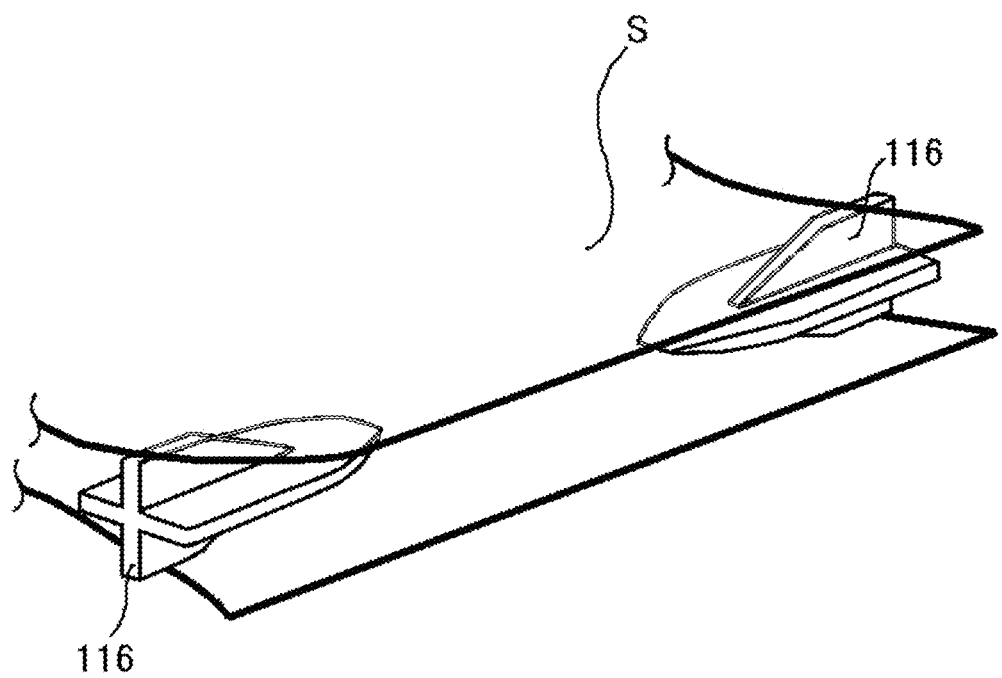
FIG. 22 is another perspective view illustrating how the separation claw separates the two sheets of the lamination sheet from each other.

FIG. 19 is a schematic view of the separation claws in the sheet separation device. FIGS. 20 to 22 are perspective views illustrating how the separation claws separate the overlapping sheets of the lamination sheet S from each other.

As illustrated in these drawings, each separation claw 116 has a shape that gradually rises from the front end to the rear end in the insertion direction (indicated by arrow C). Thus, the separation claws 116 can be smoothly inserted into the gap g generated in the lamination sheet S.

Additionally, as the lamination sheet S is conveyed in the forward conveyance direction (indicated by arrow A) after the separation claws 116 are inserted into the gap g (see FIGS. 20 and 21), the lamination sheet S can be reliably separated to the rear end thereof (see FIG. 22).

Alternatively, the sheet separation device 100 can include only a single separation claw 116, and the separation claw 116 can be inserted into only one side of the lamination sheet S. Moreover, the shape of the separation claw 116 is not limited to that illustrated in the drawing. For example, the separation claw 116 can be elliptical or can have a structure capable of rotating by 90 degrees.

Returning back to FIG. 14, the description is continued below. In the sheet separation device 100, after the exit roller pair 113 conveys the lamination sheet S in the forward conveyance direction (direction A) and separates the lamination sheet S, the bifurcating claw T2 moves (rotates) clockwise around the rotation shaft as a fulcrum and closes the conveyance passage along which the lamination sheet S has been conveyed so far.

Figure 15:
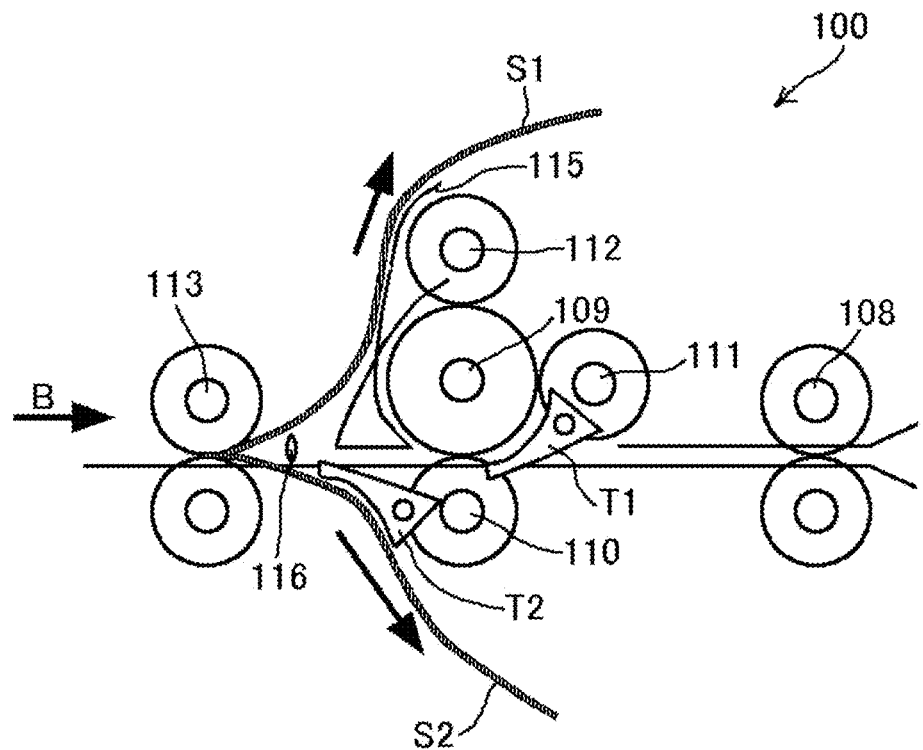
FIG. 15 is another view of the main part of the sheet separation device according to one embodiment.

Next, as illustrated in FIG. 15, the exit roller pair 113 reverses the rotation, and conveys the lamination sheet S in the backward conveyance direction (direction B). Then, the two separated sheets of the lamination sheet S (hereinafter referred to as an upper sheet S1 and a lower sheet S2) are guided in different directions. That is, the upper sheet S1 is conveyed along the sheet guide 115, and the lower sheet S2 is conveyed along the bifurcating claw T2 that also serves as a sheet guide. As illustrated in the drawing, the lamination sheet S opens wide to the bonded side as one end.

Figure 16:
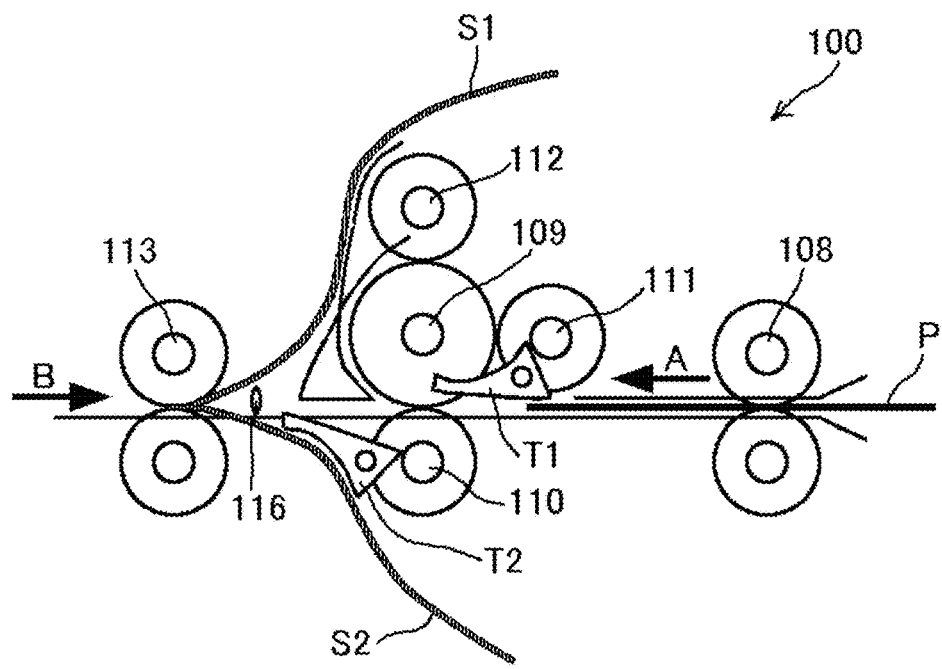
FIG. 16 is another view of the main part of the sheet separation device according to one embodiment.

Subsequently, as illustrated in FIG. 16, the exit roller pair 113 conveys the lamination sheet S to the designated position in the backward conveyance direction (direction B) and waits. Meanwhile, the entrance roller pair 108 that is an inserter conveys the insertion sheet P from the sheet feeding tray 103 (see FIG. 5) toward the exit roller pair 113 in the forward conveyance direction (direction A). At this time, the bifurcating claw T1 is positioned above the conveyance passage, and the insertion sheet P passes below the bifurcating claw T1.

Figure 17:
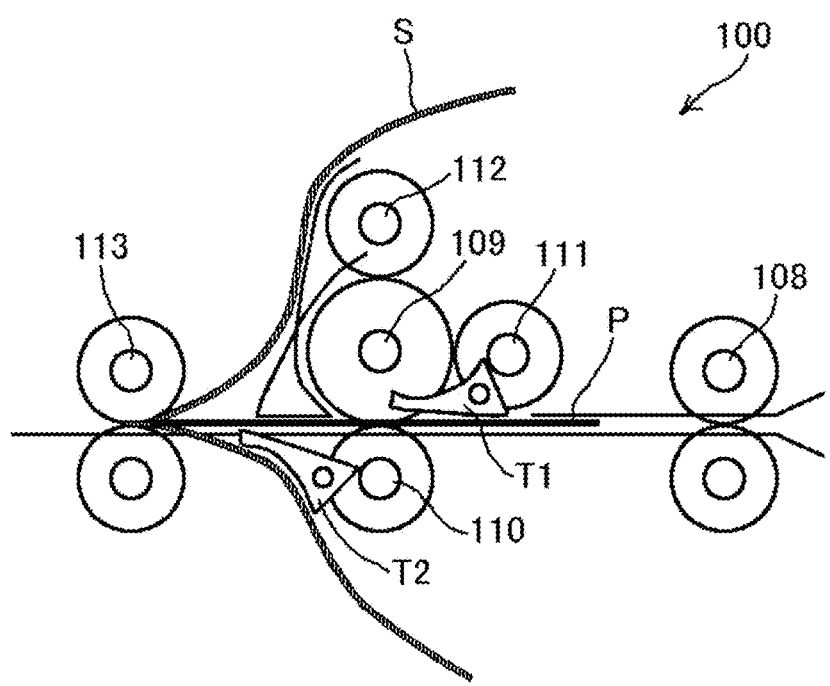
FIG. 17 is another view of the main part of the sheet separation device according to one embodiment.

Next, as illustrated in FIG. 17, the insertion sheet P is inserted into the opened lamination sheet S. These operations can be triggered by the sheet position detection by the sheet sensor C4 (see FIG. 5).

Figure 18:
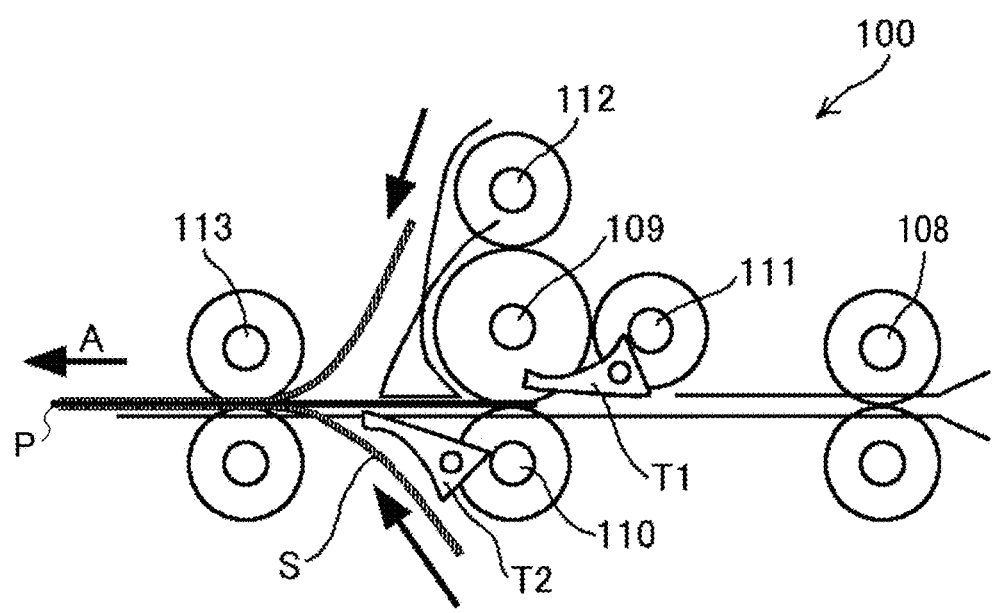
FIG. 18 is another view of the main part of the sheet separation device according to one embodiment.

As illustrated in FIG. 18, as the exit roller pair 113 conveys the lamination sheet S, with the insertion sheet P inserted therein, in the forward conveyance direction (direction A), the two sheets are again overlaid one on another, and the opening is closed. Then, the sheet separation device 100 ejects and stacks the lamination sheet S sandwiching the insertion sheet P onto the output tray 104 (FIG. 5) with the exit roller pair 113, or a roller or the like, positioned downstream from the exit roller pair 113.

As described above, the sheet separation device 100 according to the present embodiment can open the lamination sheet S wide and insert and sandwich the insertion sheet P therein. Therefore, for example, compared with a laminator using a vacuum device, the structure is simple, and the entire apparatus can be simple and compact.

In addition, as illustrated in FIG. 5, the sheet separation device 100 according to the present embodiment can store the lamination sheets S and insertion sheet P on separate trays to be conveyed separately. Accordingly, it is not necessary to stack the lamination sheets S and the insertion sheets P in a predetermined order, for added convenience. In the present embodiment, the lamination sheets S are stacked on the sheet tray 102, and the insertion sheets P are stacked on the sheet feeding tray 103. However, where to stack the lamination sheets S and the insertion sheets P are not limited thereto. Alternatively, the insertion sheet P can be stacked on the sheet tray 102 and the lamination sheet S can be stacked on the sheet feeding tray 103.

Figure 25:
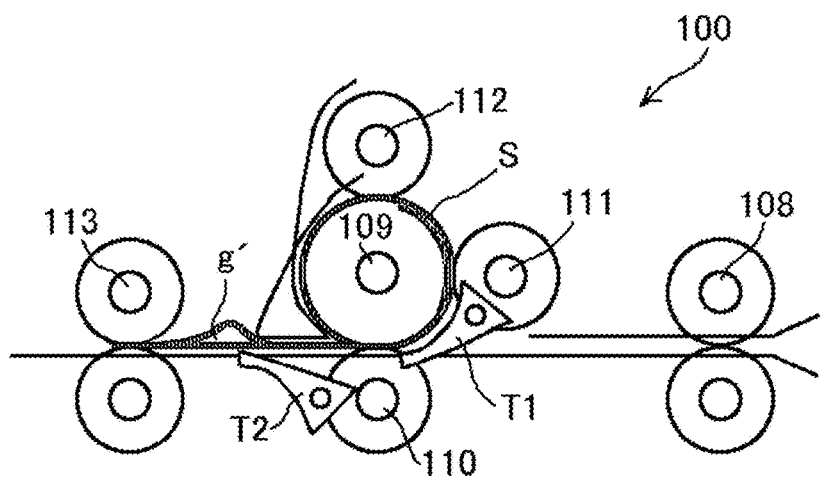
FIG. 25 is another view of the main part of the sheet separation device according to one embodiment.
Figure 26:
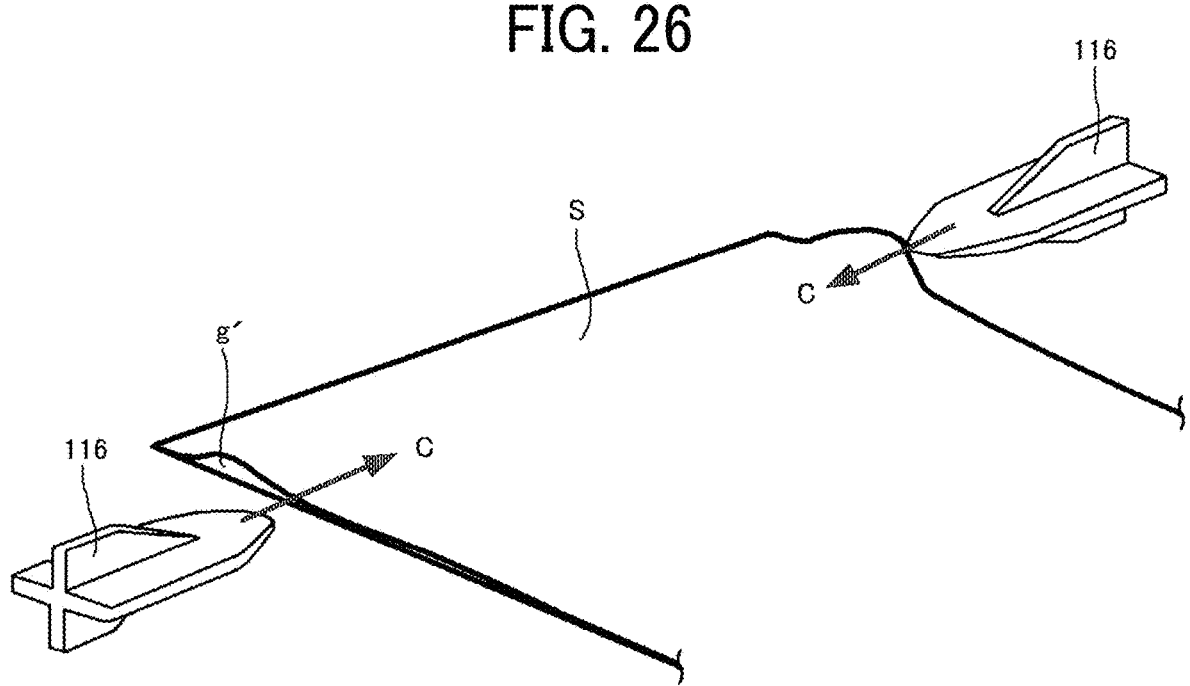
FIG. 26 is another view of the main part of the sheet separation device according to one embodiment.
Figure 27:
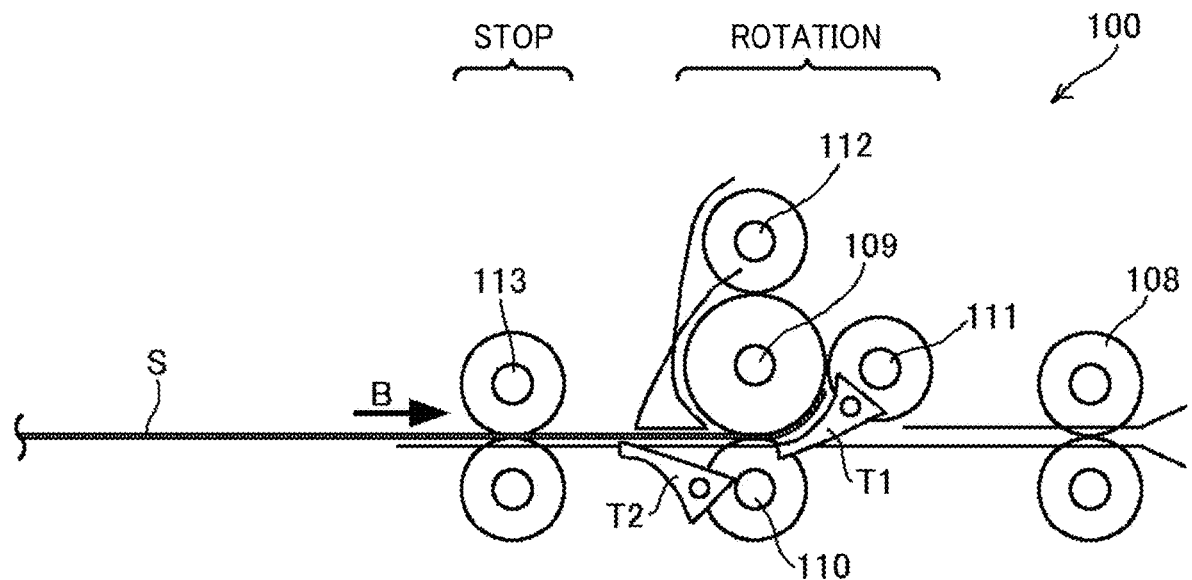
FIG. 27 is another view of the main part of the sheet separation device according to one embodiment.

Subsequently, a challenge in the sheet separation device is described with reference to FIGS. 23 to 26, and a feature of the present embodiment to overcome the challenge is described with reference to FIGS. 27 to 29.

Figure 23:
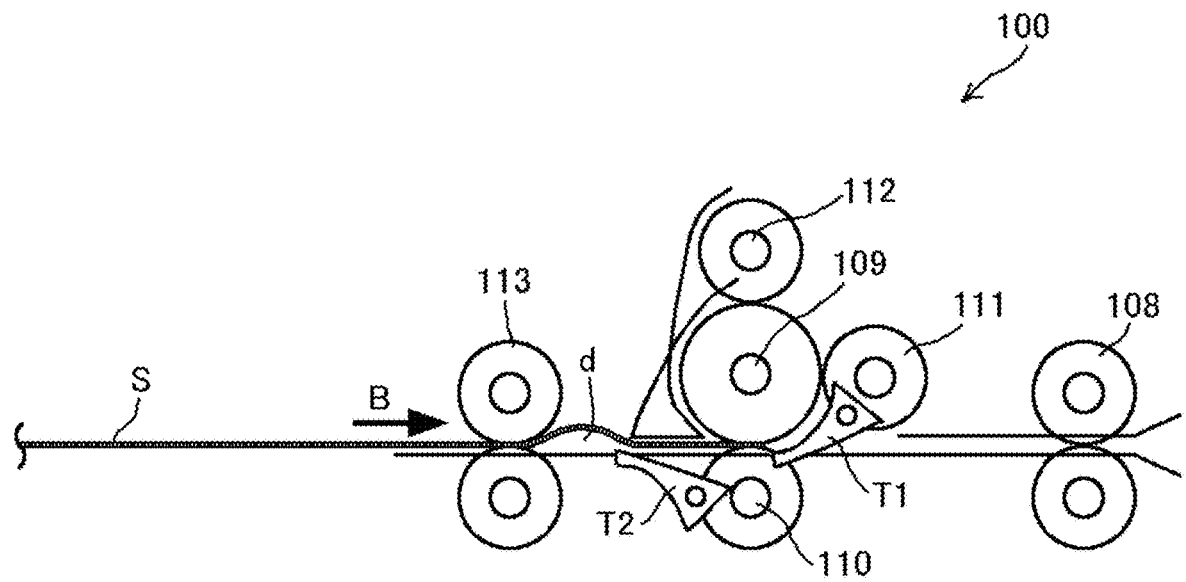
FIG. 23 is another view of the main part of the sheet separation device according to one embodiment.

As illustrated in FIG. 23, in the process of winding the lamination sheet S around the winding roller 109, if the lamination sheet S bends between the exit roller pair 113 and the winding roller 109, the bent portion causes force pushing the lamination sheet S against the winding roller 109.

Conceivably, the bending d of the lamination sheet S occurs, for example, when the correction of skew of the lamination sheet S is performed. Another conceivable cause is a linear speed difference between the winding roller 109 and the exit roller pair 113. That is, the bending d occurs when the conveyance speed of the exit roller pair 113 is faster than the conveyance speed of the winding roller 109 (the peripheral speed at the portion of the winding roller 109 opposite the driven roller 110).

Note that the correction of skew of the lamination sheet S is the following operation. In a state where the winding roller 109 is stopped, the exit roller pair 113 conveys the lamination sheet S so that the leading end of the lamination sheet S in the conveyance direction toward the winding roller 109 is caught in the nip between the winding roller 109 and the driven roller 110, for correcting the skew of the lamination sheet S.

Figure 24:
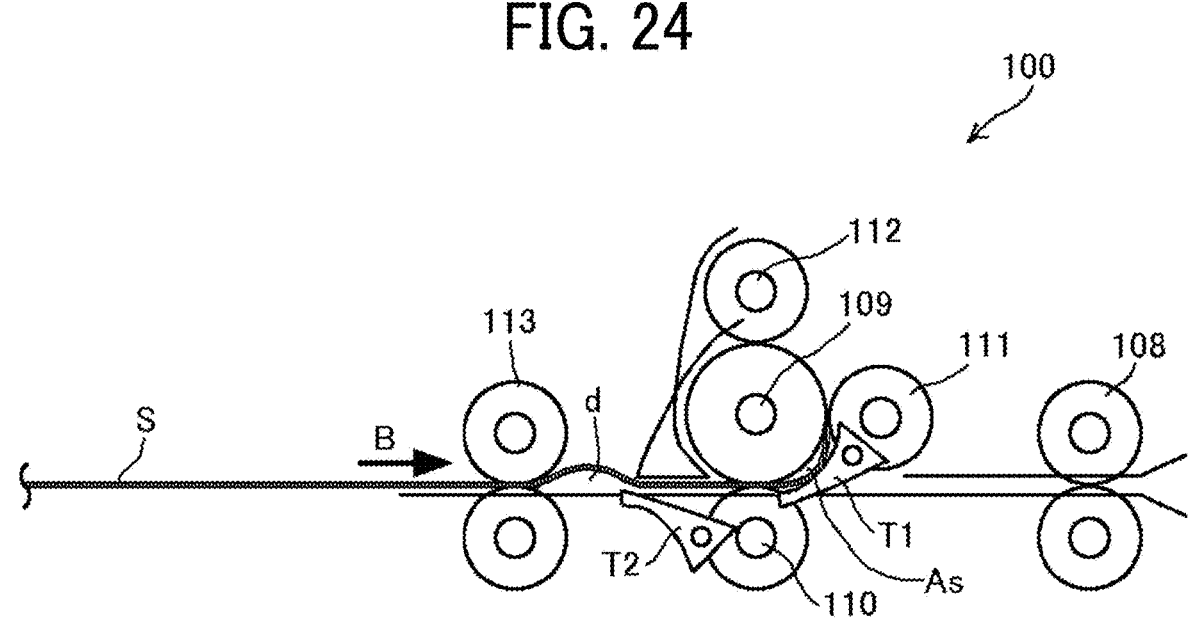
FIG. 24 is another view of the main part of the sheet separation device according to one embodiment.

Since the force for pushing in the lamination sheet S is not necessarily uniform in the width direction (longitudinal direction) of the winding roller 109, as illustrated in FIG. 24, there is a possibility that the air layer As occurs between the lamination sheet S and a portion of the winding roller 109. The air layer As causes the difference in the inner diameter of the lamination sheet S being wound. Accordingly, as illustrated in FIG. 25 or FIG. 26, a space g' for inserting the separation claws 116 may be distorted.

If the space g' for inserting the separation claws 16 is distorted, there is a risk that the separation claws 116 are not inserted into the space g' and the two sheets of the lamination sheet S may not be separated.

Therefore, the sheet separation device 100 according to the present embodiment operates as follows under control of the controller 190. In a state where the winding roller 109 is not driven, the exit roller pair 113 conveys the lamination sheet S so that the leading end thereof is nipped between the winding roller 109 and the driven roller 110, forming the bending portion. Then, as illustrated in FIG. 27, in a state where the exit roller pair 113 is not driven, the winding roller 109 is rotated, to resolve the bending d (FIG. 23) of the lamination sheet S between the exit roller pair 113 and the winding roller 109. At that time, the exit roller pair 113 is configured to be rotated by movement of the lamination sheet S. Hereinafter, this is referred to as Configuration 1.

Figure 28:
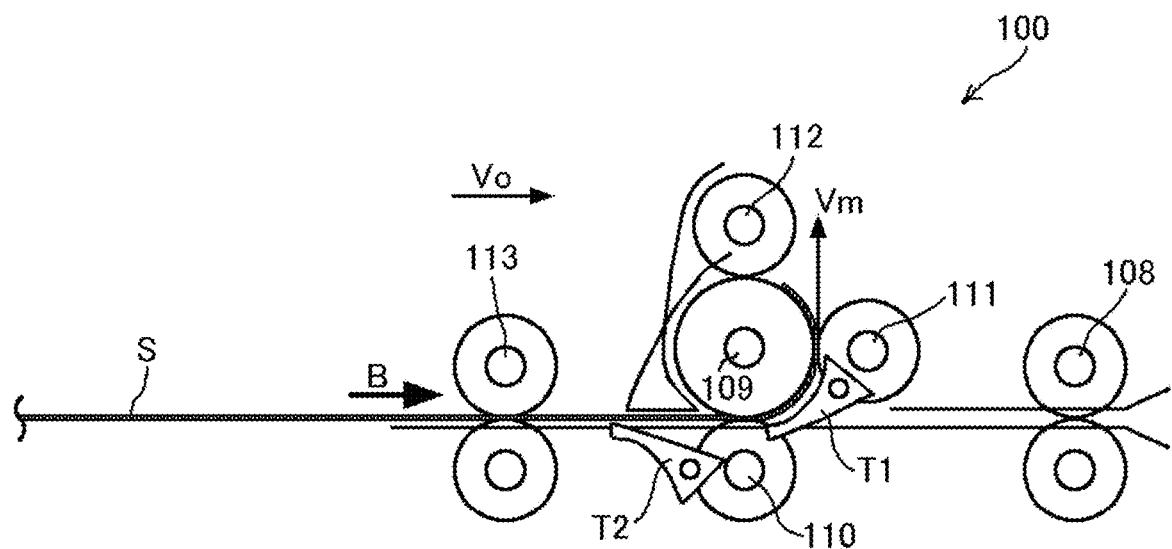
FIG. 28 is another view of the main part of the sheet separation device according to one embodiment.

Then, as illustrated in FIG. 28, the controller 190 of the sheet separation device 100 rotates the winding roller 109, at the position opposite the driven roller 110, at a peripheral speed Vm (second speed) that is faster than a conveyance speed Vo (first speed) at which the exit roller pair 113 conveys the lamination sheet S to the winding roller 109 (Vo<Vm), and the lamination sheet S is wound around the winding roller 109. By winding the lamination sheet S around the winding roller 109a, a difference in winding circumferential length is created between the overlying sheets of the lamination sheet S, and the lamination sheet S is separated, which is hereinafter referred to as Configuration 2.

The "peripheral speed Vm of the winding roller 109 at the position opposite the driven roller 110" signifies the speed (mm/s) of the winding roller 109 in the arc direction following the circumference, on the outer peripheral surface around which the lamination sheet S is wound. The "conveyance speed Vo" signifies the speed (mm/s) at which the lamination sheet S moves in the conveyance direction via the exit roller pair 113 toward the winding roller 109. These can also be referred to as linear speeds (mm/s).

Such setting can prevent the bending of the lamination sheet S between the exit roller pair 113 and the winding roller 109. Therefore, the lamination sheet S can be tightly wound around the winding roller 109.

There are cases where the lamination sheet S is not bent between the exit roller pair 113 and the winding roller 109 at the start of winding, such as when the skew correction of the lamination sheet S is not performed. In such a case, implementing Configuration 2 suffices for preventing the bending of the lamination sheet S between the rollers. In other words, stopping the exit roller pair 113 is not necessary (Configuration 1 is not necessary) in this case.

Figure 29:
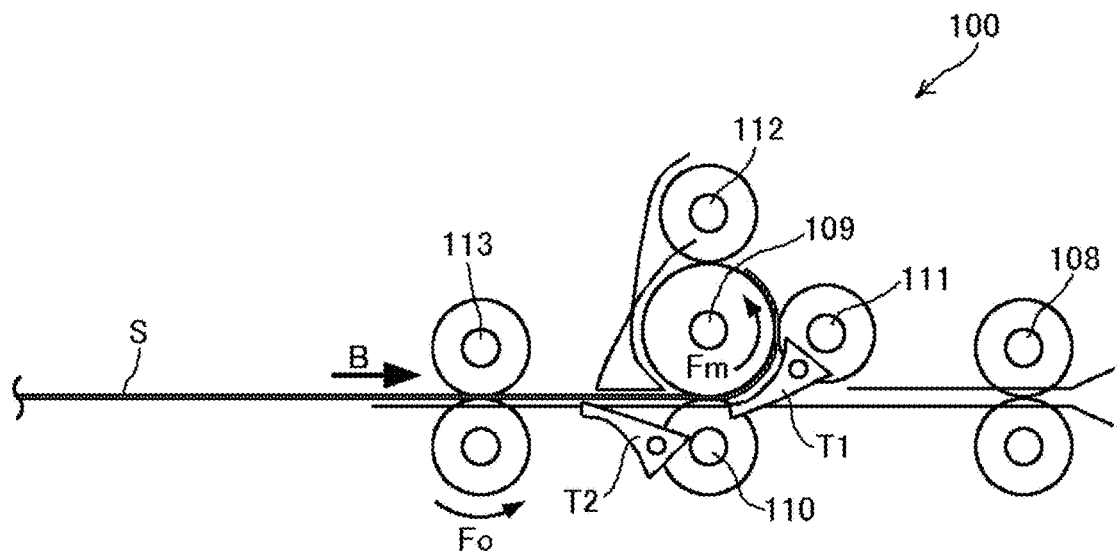
FIG. 29 is another view of the main part of the sheet separation device according to one embodiment.

As illustrated in FIG. 29, in the sheet separation device 100, the exit roller pair 113 nips and conveys the lamination sheet S. Advantageously, the nipping force (Fm) with which the winding roller 109 and the driven roller 110 nip the lamination sheet S therebetween is greater than the nipping force (Fo) with which the exit roller pair 113 nips the lamination sheet S.

When the winding roller 109 pulls the lamination sheet S due to the linear speed difference, the lamination sheet S can slip at the nip of the exit roller pair 113. As the lamination sheet S slips, the end of the skew-corrected sheet S is not displaced, and reliable winding can be performed.

As described above, the sheet separation device 100 according to the present embodiment does not cause bending of the lamination sheet S between the exit roller pair 113 and the winding roller 109 at the start of winding. Accordingly, the lamination sheet S can be reliably wound around the winding roller 109. Since the space is reliably generated between the separated sheets of the lamination seat S, the separation claw 116 can be inserted reliably.

Descriptions are given of variations of the present embodiment.

A first variation is described below.

In the above description with reference to FIG. 10, the end of the lamination sheet S can be secured to the winding roller 109 as the lamination sheet S is wound around over the full circumference or greater of the winding roller 109. By contrast, in the present variation, a description is given of a sheet separation device that can separate sheets of the lamination sheet S by winding the sheets over less than the full circumference of the roller.

Figure 30:
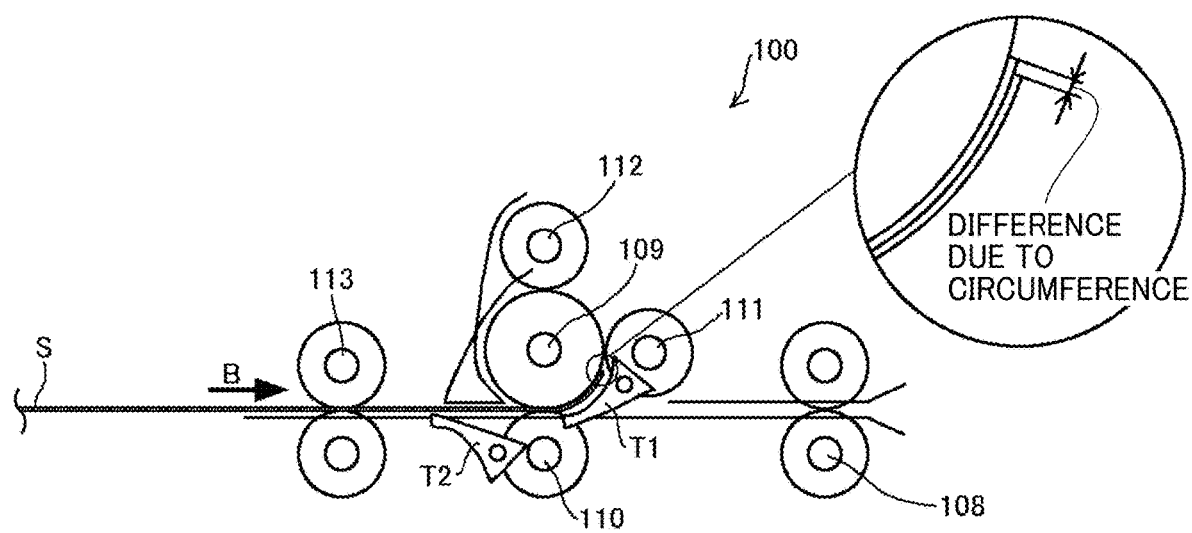
FIG. 30 is a view of a structure illustrated in FIG. 8, together with a partial enlarged view of a lamination sheet on a winding roller illustrated in FIG. 4.
Figure 31:
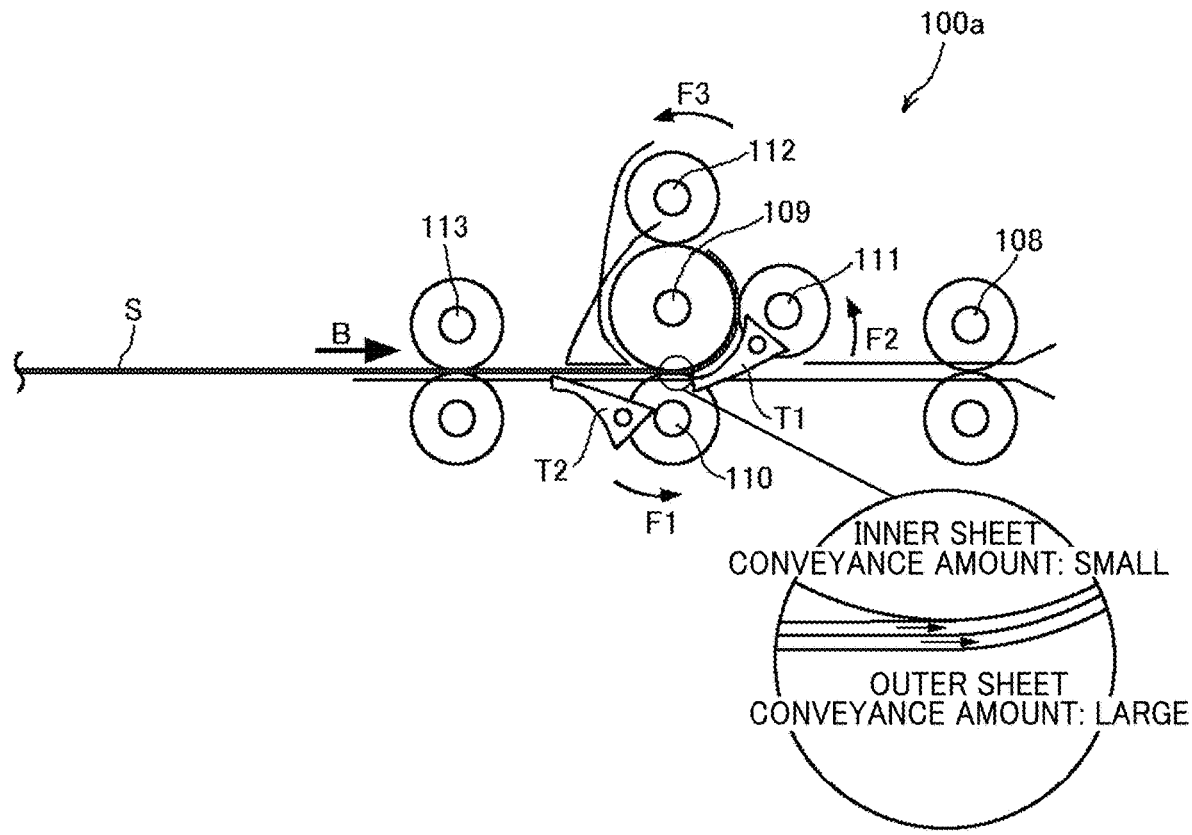
FIG. 31 is a view of a main part of a sheet separation device according to a variation of one embodiment, together with a partial enlarged view of the lamination sheet on the winding roller.

FIG. 30 is a view of the structure illustrated in FIG. 8, together with a partial enlarged view of the lamination sheet S on the winding roller. FIG. 31 is a view of a main part of the sheet separation device according to the present variation, together with a partial enlarged view of the lamination sheet on the winding roller.

As illustrated in the partial enlarged view of FIG. 30, when the lamination sheet S is wound around the winding roller 109, a difference is created in the conveyance amount of the lamination sheet S due to the difference in winding circumferential length.

By contrast, as illustrated in FIG. 31, in a sheet separation device 100a according to the present variation, a relation F1<F2<F3 is established where F represents the nipping force provided by the driven roller 110, F2 represents the nipping force provided by the grip roller 111, and F3 represents the nipping force provided by the grip roller 112. That is, the nipping forces by the grip rollers 111 and 112 are made larger than the nipping force provided by the driven roller 110, and the displacement between the inner sheet and the outer sheet of the lamination sheet S is regulated in the portions where the grip rollers 111 and 112 press against the driven roller 110.

Therefore, the inner sheet and outer sheet slip past each other by an amount equivalent to the circumferential length difference in the nip between the driven roller 110 and the winding roller 109. Thus, the conveyance amount of the inner sheet of the lamination sheet S is smaller than the conveyance amount of the outer sheet. As a result, even if the lamination sheet S is not wound around the winding roller 109 over the entire circumference or greater, the slack in the inner sheet gathers between the exit roller pair 113 and the winding roller 109, thereby creating the gap (space) g between the inner sheet and the outer sheet.

Thus, owing to the configuration in which the strengths of nipping force provided by the driven roller 110 and the grip rollers 111 and 112 increase in the winding rotation direction of the winding roller 109, the lamination sheet S can be separated by winding the sheets over less than full circumference of the roller. Accordingly, the winding amount of the lamination sheet S can be reduced, and time required for separation can be shortened.

Further, it is desirable that the nipping force provided by the driven roller 110 and the grip rollers 111 and 112 can be changed by, for example, adjusting the respective contact forces against the winding roller 109. The sheet separation device 100a is advantageous in that sheets of various sizes can be separated by adjusting the amount of winding of the sheet.

A second variation is described below.

Figure 32:
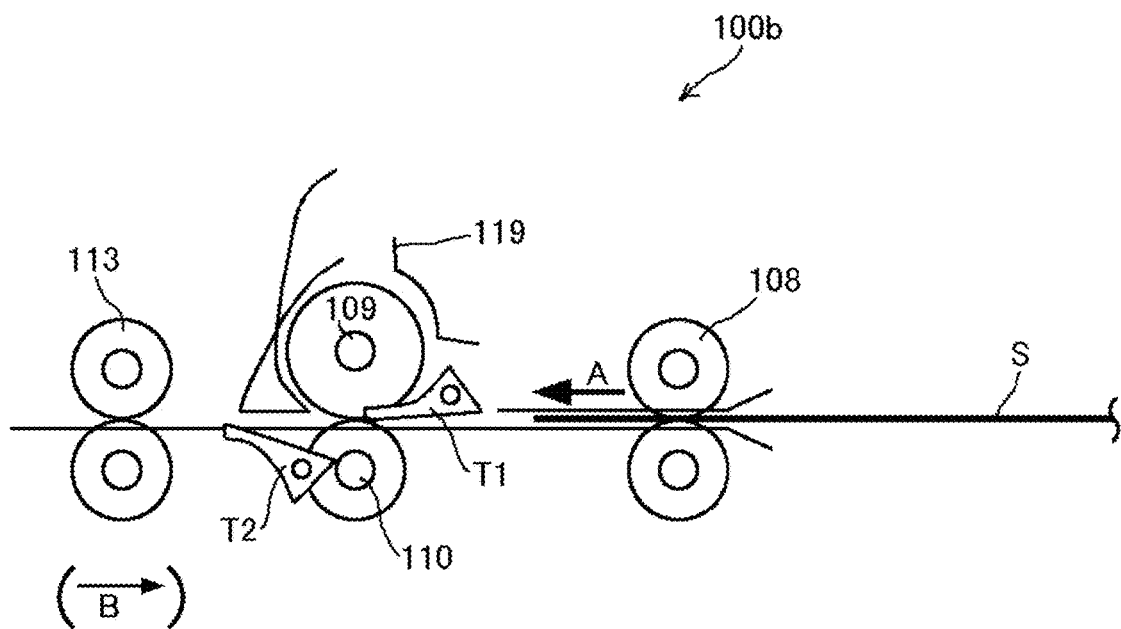
FIG. 32 is a view of a main part of a sheet separation device according to another variation.

FIG. 32 is a view illustrating a main part of a sheet separation device according to a second variation. As illustrated in FIG. 32, a sheet separation device 100b according to the present variation includes, instead of the grip rollers 111 and 112, a guide member 119 disposed at a distance from the circumference of the winding roller 109, to guide the two-ply lamination sheet S around the circumference of the winding roller 109.

By winding the lamination sheet S around the winding roller 109 with the guide member 119, the lamination sheet S can be separated. Note that both the guide member 119 and the grip rollers 111 and 112 can be provided.

A third variation is described below.

The sheet separation device 100 according to the above-described embodiments and the variations thereof can convey the lamination sheet with the bonded side (one side) positioned upstream or downstream in the conveyance direction. In the embodiment described above, the lamination sheet S is conveyed with the bonded side being the downstream end (on the leading end) in the forward conveyance direction indicated by arrow A as illustrated, for example, in FIG. 18. In other words, the unbonded side is the upstream end (on the rear side) in direction A.

Alternatively, the lamination sheet S can be conveyed with the unbonded side being the downstream end (on the leading side) in the forward conveyance direction indicated by arrow A. That is, the bonded side can be the upstream end (on the rear side) in the forward conveyance direction indicated by arrow A. In this case, when the lamination sheet S is wound around the winding roller 109, the rear end in the winding direction, that is, the unbonded ends (one side) of the lamination sheet S separate from each other and deviate from each other by the difference in circumferential length. The lamination sheet S can be separated by pinching such deviated portion with, for example, an electric gripper.

Figure 33:
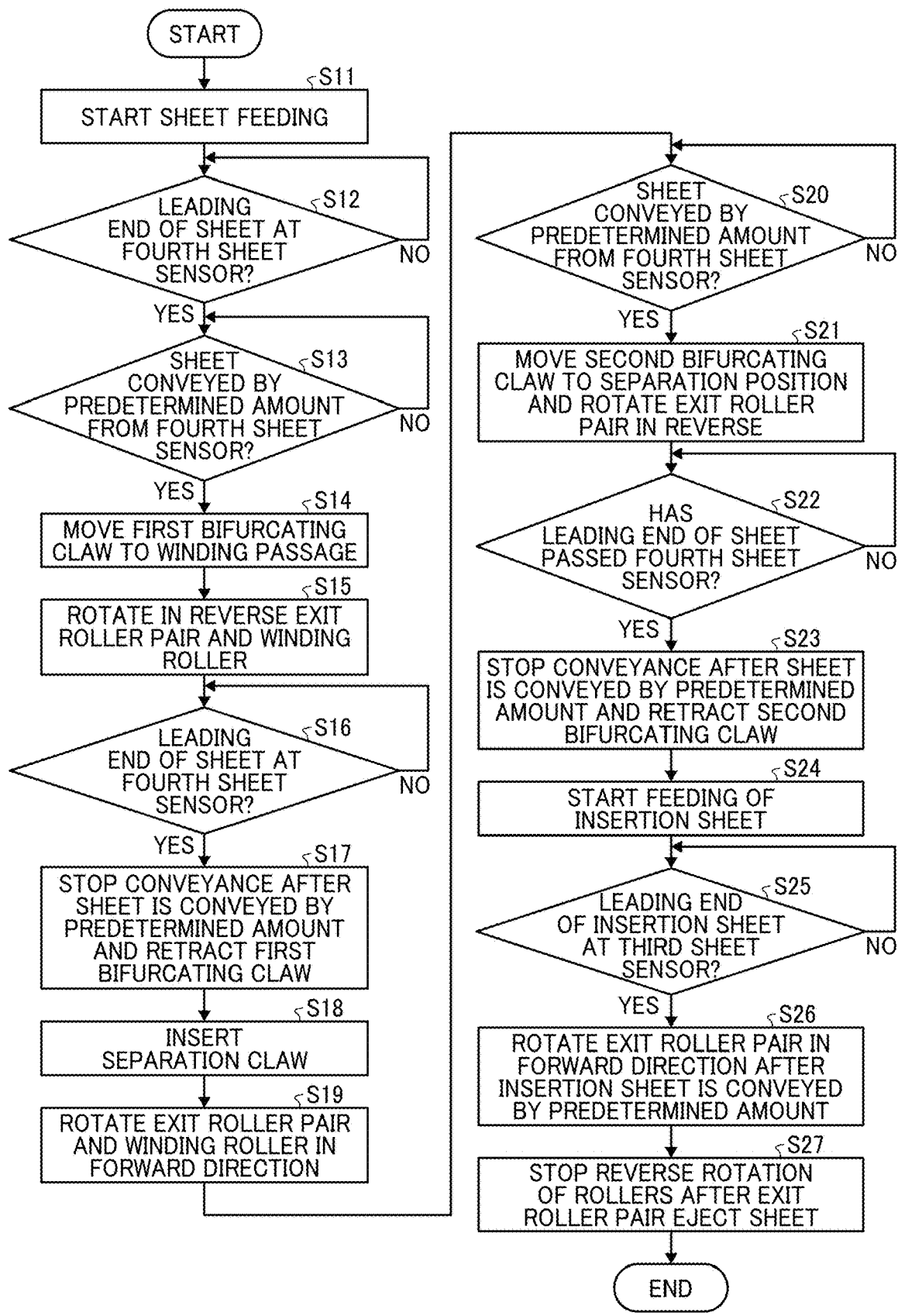
FIG. 33 is a flowchart illustrating a series of operations from sheet feeding to completion of inserting of an insertion sheet.

FIG. 33 is a flowchart illustrating a series of operations from sheet feeding to completion of inserting of the insertion sheet. The description below proceeds while indicating the reference numerals indicated in the flowchart.

In S11, the sheet separation device 100 starts feeding the lamination sheet S (see FIG. 5). In S12, the sheet separation device 100 determines whether the end of the lamination sheet S has arrived at the sheet sensor C4 as a fourth sensor (see FIG. 6). In S13, in response to a determination that the lamination sheet S has been conveyed by a predetermined amount from the sheet sensor C4 (the fourth sensor), in S14, the sheet separation device 100 moves the bifurcating claw T1 (a first bifurcating claw) to the position to guide the lamination sheet S along the winding passage (see FIG. 7).

In S15, the sheet separation device 100 rotates the winding roller 109 in the reverse direction and winds the lamination sheet S around the winding roller 109 (see FIGS. 8 to 11). Alternatively, the sheet separation device 100 rotates in the exit roller pair 113 in the reverse direction with the winding roller 109 kept stopped, so that the end of the lamination sheet S is caught in the nip between the winding roller 109 and the driven roller 110. After the lamination sheet S is thus bent, the sheet separation device 100 stops rotation of the exit roller pair 113 and rotates the winding roller 109 in the reverse direction. In S16, the sheet separation device 100 determines whether the end of the lamination sheet S has arrived at the sheet sensor C4 (the fourth sensor). In S17, the sheet separation device 100 stops conveyance of the lamination sheet S after the lamination sheet S is conveyed from the sheet sensor C4 by a predetermined amount, and returns the bifurcating claw T1 (the first bifurcating claw) to the original position. In S18, the separation claws 116 are inserted into the gap g generated as the lamination sheet S is separated (see FIG. 12).

In S19, the sheet separation device 100 rotates the exit roller pair 113 and the winding roller 109 in the forward direction, and conveys the lamination sheet S in the forward conveyance direction. As a result, the sheets of the lamination sheet S are separated from each other to the rear end in the conveyance direction (see FIGS. 13 and 14).

In response to a determination made in S20 that the lamination sheet S has been conveyed by the predetermined amount from the sheet sensor C4, in S21, the sheet separation device 100 moves the bifurcating claw T2 (a second bifurcating claw) to the separation position and rotates the exit roller pair 113 in the reverse direction. In S22, the sheet separation device 100 determines whether or not the end of the lamination sheet S has passed the sheet sensor C4 (see FIG. 15).

In S23, the sheet separation device 100 stops conveyance of the lamination sheet S after the lamination sheet S is conveyed from the sheet sensor C4 by a predetermined amount, and retracts the bifurcating claw T2 (the second bifurcating claw) to the original position. At this time, the lamination sheet S is opened to the bonded side as an end (see FIG. 15).

In S24, the sheet separation device 100 starts feeding the insertion sheet P (see FIG. 16). In S25, the sheet separation device 100 determines that the end of the insertion sheet P has passed the sheet sensor C3 (a third sheet sensor). Then, in S26, the sheet separation device 100 conveys the insertion sheet P by a predetermined amount, to insert the insertion sheet P into the lamination sheet S (see FIG. 17). Then, the exit roller pair 113 is rotated in the forward direction to convey the lamination sheet S, with the insertion sheet P inserted therein, in the forward conveyance direction. Thus, the inserting completes (see FIG. 18). In S27, after the inserting completes and the lamination sheet S is ejected by the exit roller pair 113, the sheet separation device 100 stops the rotation of all rollers.

Next, descriptions are given of a laminator, an image forming apparatus, and an image forming system including a sheet separation device according to the present disclosure.

Figure 34:
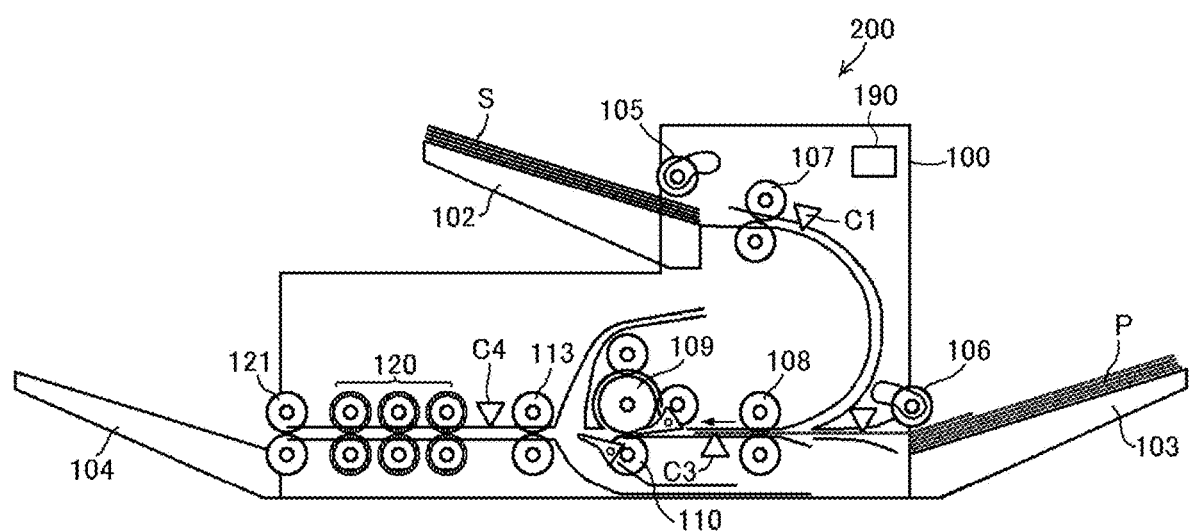
FIG. 34 is a view illustrating an example of general arrangement of a laminator including a sheet separation device according to one embodiment.

FIG. 34 is a view illustrating an example of general arrangement of the laminator including the sheet separation device according one embodiment of the present disclosure. As illustrated in FIG. 34, a laminator 200 includes the sheet separation device 100 described above, a pressure heating roller 120 (heat and pressure member) to heat and press the lamination sheet S, and an ejection roller 121 disposed downstream from the pressure heating roller 120.

The laminator 200 can perform a series of operations from feeding and separation of the lamination sheet S, insertion of the insertion sheet P, and lamination with heat and pressure on a stand-alone basis. This series of operations can be carried out automatically without human intervention, and convenience can be improved.

Figure 35:
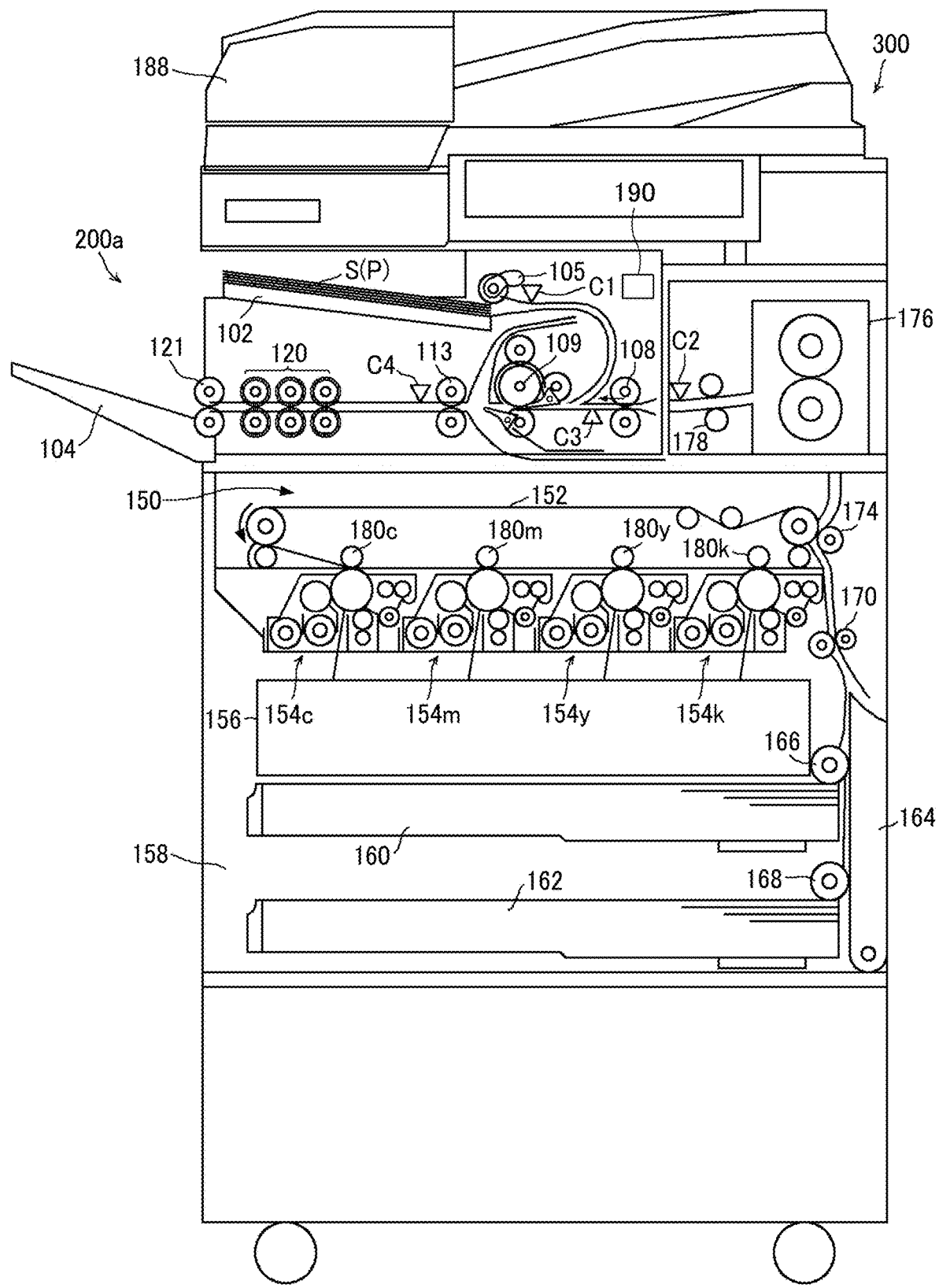
FIG. 35 is a view illustrating an example of general arrangement of an image forming apparatus including the laminator according to one embodiment.

FIG. 35 is a view illustrating an example of general arrangement of an image forming apparatus including the laminator according to one embodiment of the present disclosure. An image forming apparatus 300 illustrated in FIG. 35 includes a laminator 200a to perform a laminating process.

The laminator 200a includes the sheet tray 102 on which lamination sheets S or insertion sheets P are stacked. Additionally, the laminator 200a can receive at least one of the lamination sheets S and the insertion sheets P fed from the image forming apparatus 300. Therefore, an image can be added in-line on the lamination sheet S or the insertion sheet P by the image forming apparatus 300 (for example, a printer or a copier).

The main body of the image forming apparatus 300 is described in detail. As illustrated in FIG. 35, an intermediate transfer device 150 is disposed in the main body of the image forming apparatus 300. The intermediate transfer device 150 includes an endless intermediate transfer belt 152 entrained around a plurality of rollers and stretched almost horizontally. The intermediate transfer belt 152 rotates counterclockwise in the drawing.

Image forming devices 154c, 154m, 154y, and 154k are arranged side by side along and below the intermediate transfer belt 152 of the intermediate transfer device 150, in that order in a direction in which the intermediate transfer belt 152 is rotated. The image forming devices 154c, 154m, 154y, and 154k form toner images of cyan, magenta, yellow, and black, respectively. Each of the image forming devices 154c, 154m, 154y, and 154k includes a drum-shaped image bearer that rotates clockwise in the drawing. Around the image bearer, a charging device, a developing device, a transfer device, and a cleaning device are disposed. Below each image forming device 154, an exposure device 156 is disposed.

Below the exposure device 156, a sheet feeder 158 is disposed. The sheet feeder 158 includes a first sheet feeding tray 160 that stores lamination sheets S and a second sheet feeding tray 162 that stores insertion sheets P. The first sheet feeding tray 160 is an example of a two-ply sheet tray on which two-ply sheets are stacked, and the second sheet feeding tray 162 is an example of a medium tray on which sheet-like media are stacked.

A first sheet feeding roller 166 is disposed at the upper right of the first sheet feeding tray 160 and feeds the lamination sheets S from the first sheet feeding tray 160 one by one to a sheet feeding passage 164. A second sheet feeding roller 168 is disposed at the upper right of the second sheet feeding tray 162 and feeds the insertion sheets P from the second sheet feeding tray 162 one by one to the sheet feeding passage 164.

The sheet feeding passage 164 extends from the lower side to the upper side on the right side in the main body of the image forming apparatus 300 and communicates with the laminator 200a inside the image forming apparatus 300. The sheet feeding passage 164 is provided with a conveyance roller 170, a secondary transfer device 174 disposed opposite the intermediate transfer belt 152, a fixing device 176, a sheet ejection device 178 including an ejection roller pair, and the like in order.

The first sheet feeding roller 166, the conveyance roller 170, and the sheet feeding passage 164 are examples of a two-ply sheet feeder that feeds a two-ply sheet from the first sheet feeding tray 160 (the two-ply sheet tray). The second sheet feeding roller 168, the conveyance roller 170, and the sheet feeding passage 164 are examples of a medium feeder that feeds a sheet medium from the second sheet feeding tray 162 (the medium tray). The intermediate transfer device 150, the fixing device 176, and the like are examples of an image forming device that forms an image on a two-ply sheet or a sheet medium.

Next, a description is given of an operation of forming an image on the lamination sheet S and then performing lamination in the image forming apparatus 300 according to the present embodiment.

To form an image on the lamination sheet S, first, an image reading device 188 reads a document image, and the exposure device 156 performs image writing. Next, the image forming devices 154*c*, 154*m*, 154*y*, and 154*k* form respective color toner images on the image bearers thereof. Then, primary transfer devices 180*c*, 180*m*, 180*y*, and 180*k* sequentially transfer the toner images onto the intermediate transfer belt 152, thereby forming a color image formed thereon.

By contrast, the image forming apparatus 300 rotates the first sheet feeding roller 166 to feed the lamination sheet S to the sheet feeding passage 164. Then, the lamination sheet S is conveyed by the conveyance roller 170 through the sheet feeding passage 164 and sent to a secondary transfer position, timed to coincide with the color image on the intermediate transfer belt 152. Then, the secondary transfer device 174 transfers the color image formed on the intermediate transfer belt 152 as described above onto the lamination sheet S.

After the image transfer, the fixing device 176 fixes the image on the lamination sheet S, and the sheet ejection device 178 sends the lamination sheet S to the laminator 200*a*.

Further, the image forming apparatus 300 rotates the second sheet feeding roller 168 to feed the insertion sheet P to the sheet feeding passage 164, and the sheet ejection device 178 sends the insertion sheet P to the laminator 200*a*.

In this way, the lamination sheet S on which the image has been formed and the insertion sheet P are sent to the laminator 200*a*, and a laminating process is performed. The details of the laminating process have been described above and redundant descriptions are omitted.

With the above-described configuration, the image forming apparatus 300 according to the present embodiment can perform the laminating process with the laminator 200*a* after image formation on the insertion sheet P. In addition, the image forming apparatus 300 can perform the laminating process after image formation on both the insertion sheet P and the lamination sheet S. The image forming apparatus 300 can include another image forming device that forms an image on an insertion sheet (a sheet medium) in addition to the image forming device that forms an image on a lamination sheet (a two-ply sheet). Alternatively, the image forming device can be common to the two-ply sheet and the insertion sheet, and the conveyance passage can be configured to convey the two-ply sheet and the insertion sheet to the common image forming device.

Figure 36:
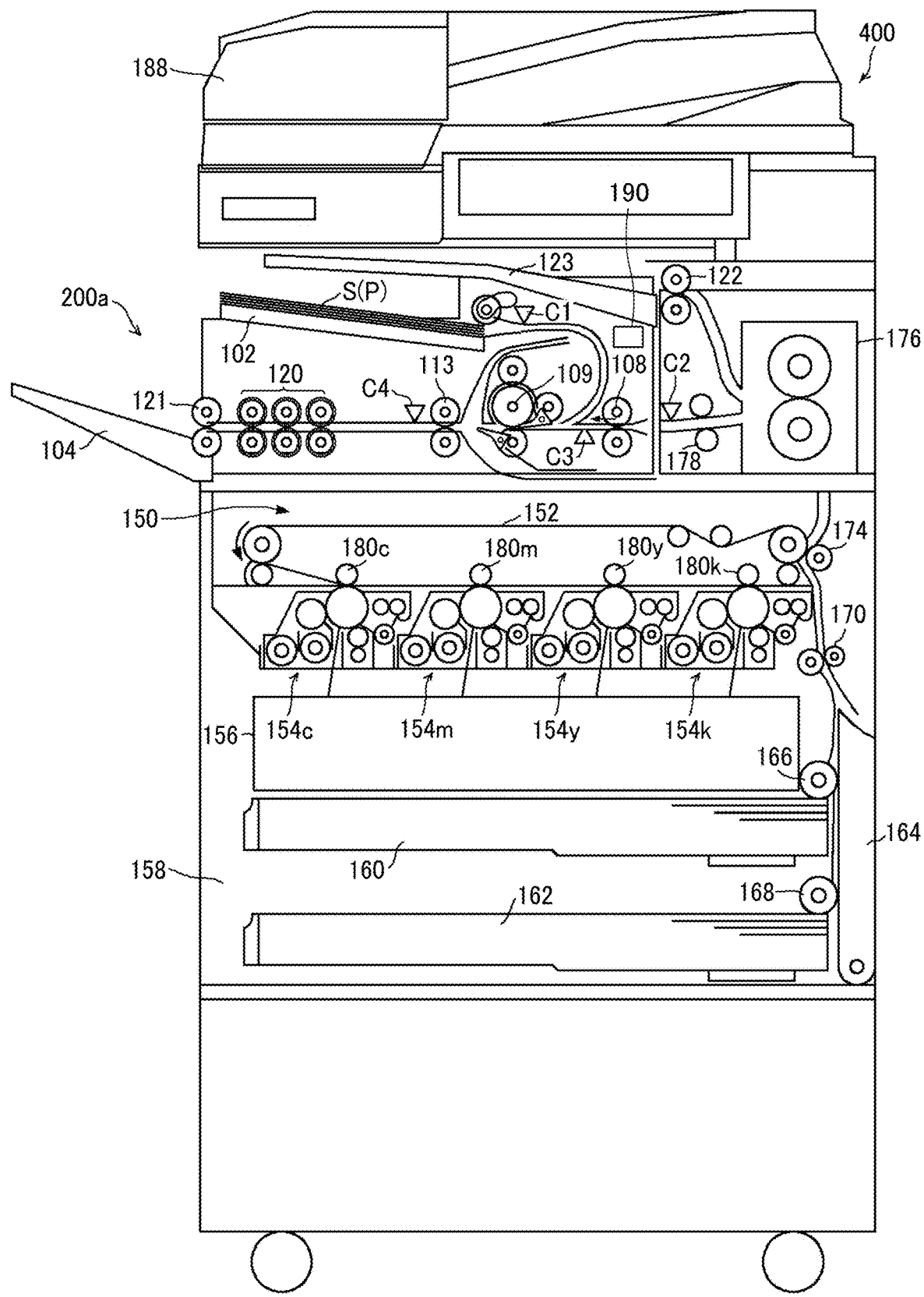
FIG. 36 is a view illustrating general arrangement of an image forming apparatus including the laminator according to a variation.

FIG. 36 is a view illustrating general arrangement of a variation of the image forming apparatus including the laminator according to one embodiment of the present disclosure. Differently from the image forming apparatus 300 illustrated in FIG. 35, the main body of the image forming apparatus 400 includes an ejection roller 122 and an output tray 123.

When the laminating process is not performed, the image forming apparatus 400 can eject the recording medium on which the image is formed using the ejection roller 122 of the main body to the output tray 123 of the main body. Therefore, the image forming apparatus 400 does not decrease the image output speed when the laminating process is not performed.

The laminator 200*a* can be removably installed inside the image forming apparatus 400. That is, when the laminating process is unnecessary, the laminator 200*a* can be removed from the image forming apparatus 400.

In addition, the laminator 200*a* can adapt to the following configuration. The sheet feeding tray 103 on which the insertion sheets P are stacked and the pickup roller 106 to feed the insertion sheets P from the sheet feeding tray 103 are mounted in the removed laminator 200*a*, so that the laminator 200*a* is used as a stand-alone machine similar to that illustrated in FIG. 34.

The image forming apparatus 300 illustrated in FIG. 35 and the image forming apparatus 400 illustrated in FIG. 36 can include a sheet separation device instead of the laminator. The image forming apparatus 400 illustrated in FIG. 36 can include a sheet separation device that is removably mounted or coupled.

Further, aspects of this disclosure can be embodied as an image forming system that includes an image forming apparatus and the sheet separation device 100, 100*a*, or 100*b*, or the laminator 200 detachably coupled to the image forming apparatus. Furthermore, aspects of this disclosure can be embodied as a system including at least one of a sheet feeder (a stacker) and a case binding device. Note that, in the case where the lamination sheet S is passed through the fixing device 176, the lamination sheet S is not bonded at the fixing temperature, but is bonded by application of heat higher than the fixing temperature.

Although the image forming apparatuses 300 and 400 employ electrophotography for image formation on the lamination sheet S and the insertion sheet in the description above, the image formation method is not limited thereto, and inkjet, screen printing, or other printing method can be used.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A sheet separation device configured to separate a two-ply sheet in which two sheets are bonded together at a portion of the two-ply sheet, the sheet separation device comprising:
a rotator;
a nipping member disposed opposite the rotator and configured to nip the two-ply sheet with the rotator;
a conveyor configured to convey the two-ply sheet between the rotator and the nipping member with a bonded portion of the two-ply sheet being an upstream end or a downstream end of the two-ply sheet in a conveyance direction of the two-ply sheet;
a winding member disposed adjacent to the rotator and configured to wind the two-ply sheet around the rotator; and
control circuitry configured to rotate the rotator at a first speed faster than a second speed at which the two-ply sheet moves to the rotator via the conveyor in winding the two-ply sheet around the rotator, to create a difference in winding circumferential length between the two sheets and separate the two sheets.

2. The sheet separation device according to claim 1, wherein the conveyor includes a pair of rotators configured to nip and convey the two-ply sheet, and
wherein a nipping force to nip the two-ply sheet between the rotator and the nipping member is greater than a nipping force to nip the two-ply sheet between the pair of rotators.

3. The sheet separation device according to claim 1, wherein the control circuitry is configured to rotate the rotator in a state where the conveyor is not driven in winding the two-ply sheet around the rotator.

4. The sheet separation device according to claim 1, wherein the nipping member is a first nipping member, and the winding member includes at least one second nipping member configured to nip the two-ply sheet with the rotator, and
wherein the at least one second nipping member is disposed around a circumference of the rotator and downstream from the first nipping member in a winding direction in which the rotator rotates to wind the two-ply sheet.

5. The sheet separation device according to claim 4, wherein a nipping force to nip the two-ply sheet between the rotator and the at least one second nipping member is greater than a nipping force to nip the two-ply sheet between the rotator and the first nipping member.

6. The sheet separation device according to claim 4, wherein the winding member includes a plurality of second nipping members around the circumference of the rotator, and
wherein a nipping force to nip the two-ply sheet between the rotator and each of the plurality of second nipping members increases in the winding direction in which the rotator rotates to wind the two-ply sheet.

7. The sheet separation device according to claim 4, wherein the winding member includes a guide member at a distance from an outer circumferential surface of the rotator in a direction orthogonal to a rotation axis of the rotator, and
wherein the guide member is configured to guide the two-ply sheet along the outer circumferential surface of the rotator.

8. The sheet separation device according to claim 1, wherein the conveyor is configured to convey the two-ply sheet in both a direction toward the rotator and a reverse direction retracting from the rotator.

9. The sheet separation device according to claim 8, wherein, in winding the two-ply sheet around the rotator, the rotator winds the two-ply sheet with the bonded portion of the two-ply sheet being the upstream end in the conveyance direction in which the conveyor conveys the two-ply sheet toward the rotator.

10. The sheet separation device according to claim 9, further comprising a separation claw disposed between the rotator and the conveyor in the conveyance direction and configured to move in a width direction of the two-ply sheet,
wherein the control circuitry is configured to:
insert, in the width direction, the separation claw into a space between the two sheets of the two-ply sheet; and
cause the conveyor to convey the two-ply sheet in the reverse direction retracting from the rotator with the separation claw inserted in the space, to separate the two sheets of the two-ply sheet.

11. The sheet separation device according to claim 10, further comprising a sheet guide configured to guide the separated two sheets of the two-ply sheet to different passages,
wherein the conveyor is configured to convey the separated two sheets to the sheet guide, to open the two-ply sheet.

12. The sheet separation device according to claim 11, further comprising:
a first stacking tray configured to store the two-ply sheet;
a first feeder configured to feed the two-ply sheet from the first stacking tray to the conveyor;
a second stacking tray configured to store a sheet medium to be inserted into the two-ply sheet; and
a second feeder configured to feed, from the second stacking tray, the sheet medium into the two-ply sheet.

13. A laminator comprising:
the sheet separation device according to claim 1; and
a heat and pressure member configured to heat and press together the two sheets of the two-ply sheet.

14. An image forming apparatus comprising:
a two-ply sheet tray configured to store the two-ply sheet;
a two-ply sheet feeder configured to feed the two-ply sheet from the two-ply sheet tray;
an image forming device configured to form an image on the two-ply sheet; and
the sheet separation device according to claim 1, to separate the two sheets of the two-ply sheet.

15. The image forming apparatus according to claim 14, further comprising a heat and pressure member configured to heat and press the two-ply sheet,
wherein the sheet separation device and the heat and pressure member comprise a laminator.

16. The image forming apparatus according to claim 14, further comprising:
a medium tray configured to store a sheet medium;
a medium feeder configured to feed the sheet medium from the medium tray;
an image forming device configured to form an image on the sheet medium; and
an inserter configured to insert the sheet medium on which the image is formed into the two-ply sheet.

17. An image forming apparatus comprising:
a medium tray configured to store a sheet medium;
a medium feeder configured to feed the sheet medium from the medium tray;
an image forming device configured to form an image on the sheet medium;
the sheet separation device according to claim 1, to separate the two sheets of the two-ply sheet; and
an inserter configured to insert the sheet medium on which the image is formed into the two-ply sheet.

18. The image forming apparatus according to claim 17, further comprising a heat and pressure member configured to heat and press the two-ply sheet,
wherein the sheet separation device and the heat and pressure member comprise a laminator.

19. An image forming system comprising:
an image forming apparatus; and
the sheet separation device according to claim 1, removably coupled to the image forming apparatus.

20. The image forming system according to claim 19, further comprising a heat and pressure member configured to heat and press the two-ply sheet,
wherein the sheet separation device and the heat and pressure member comprise a laminator.

\* \* \* \* \*